(12) United States Patent
Luo et al.

(10) Patent No.: US 9,919,956 B2
(45) Date of Patent: Mar. 20, 2018

(54) METHOD OF ASSEMBLING OPTICAL FIBER PREFORMS

(71) Applicant: Corning Incorporated, Corning, NY (US)

(72) Inventors: Xiaoming Luo, Hummelstown, PA (US); Chunfeng Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/273,033

(22) Filed: Sep. 22, 2016

(65) Prior Publication Data

US 2017/0101339 A1 Apr. 13, 2017

Related U.S. Application Data

(60) Provisional application No. 62/238,381, filed on Oct. 7, 2015.

(51) Int. Cl.
*G02B 6/036* (2006.01)
*C03C 13/04* (2006.01)
(Continued)

(52) U.S. Cl.
CPC ...... *C03C 13/046* (2013.01); *C03B 37/01211* (2013.01); *C03B 37/01228* (2013.01);
(Continued)

(58) Field of Classification Search
CPC .. G02B 6/036; G02B 6/0365; G02B 6/03627; G02B 6/03638; G02B 6/03644;
(Continued)

(56) References Cited

U.S. PATENT DOCUMENTS 4,204,850 A   5/1980 Dominick
4,336,049 A * 6/1982 Takahashi ......... C03B 37/01413
                                                          65/390

(Continued)

FOREIGN PATENT DOCUMENTS

DE  102011014915 A1  4/2012
EP        300640     10/1993
EP       1426339     11/2005

OTHER PUBLICATIONS

Bachmann et al, "Thermal expansion coefficients of doped and undoped silica prepared by means of PCVD", J. Mat. Sci., 23, 2584-2588, 1988.
Zhou, C., et al., "3D phase-field simulations of interfacial dynamics in Newtonian and viscoelastic fluids", J. Comput. Phys., 229, 498-511, 2010.

*Primary Examiner* — Akm Enayet Ullah
*Assistant Examiner* — Michael Mooney
(74) *Attorney, Agent, or Firm* — Kevin L. Bray

(57) ABSTRACT

The present disclosure provides optical fiber preforms formed from core canes having large core-clad ratio, intermediate core-cladding assemblies, and methods for making the preforms and core cladding assemblies. The preforms are made from core canes having a contoured end surface. The contoured end surface(s) include a depression that acts to reduce the stress that develops at the junction of the end surface of the core cane with a soot cladding monolith arising from differences in the coefficient of thermal expansions of the core can and soot cladding monolith. The contoured end surface(s) leads to preforms having low defect concentration and low probability of failure during fiber draw.

19 Claims, 22 Drawing Sheets

(51) Int. Cl.
*C03B 37/027* (2006.01)
*C03B 37/012* (2006.01)

(52) U.S. Cl.
CPC ...... *C03B 37/01248* (2013.01); *G02B 6/0365* (2013.01); *G02B 6/03627* (2013.01); *G02B 6/03638* (2013.01); *C03B 2201/12* (2013.01); *C03B 2201/20* (2013.01); *C03B 2201/31* (2013.01); *C03B 2203/224* (2013.01); *C03B 2203/23* (2013.01); *C03C 2213/00* (2013.01)

(58) Field of Classification Search
CPC ......... C03B 37/01205; C03B 37/01211; C03B 37/01228; C03B 37/01248; C03B 37/01413; C03B 37/01446; C03B 37/01884; C03B 37/075
USPC .................. 385/123–128, 141–144; 65/377, 65/384–385, 390, 391, 299, 400, 403, 421
See application file for complete search history.

(56) References Cited

U.S. PATENT DOCUMENTS

| | | |
|---|---|---|
| 4,657,040 A | 4/1987 | Torres |
| 4,775,401 A | 10/1988 | Fleming |
| 6,813,908 B2 | 11/2004 | Early |
| 6,843,076 B2 | 1/2005 | Dawes |
| 2005/0262877 A1* | 12/2005 | Balakrishnan .... C03B 37/01413 65/421 |
| 2013/0000840 A1 | 1/2013 | Dawes |
| 2014/0174133 A1 | 6/2014 | Billings |
| 2014/0186645 A1 | 7/2014 | Briere et al. |
| 2015/0043880 A1 | 2/2015 | Brehm et al. |
| 2016/0009589 A1 | 1/2016 | Billings |
| 2016/0075591 A1 | 3/2016 | Bookbinder |
| 2016/0257612 A1 | 9/2016 | De Paor et al. |

* cited by examiner (a)

(b)

(c)

Figure 16
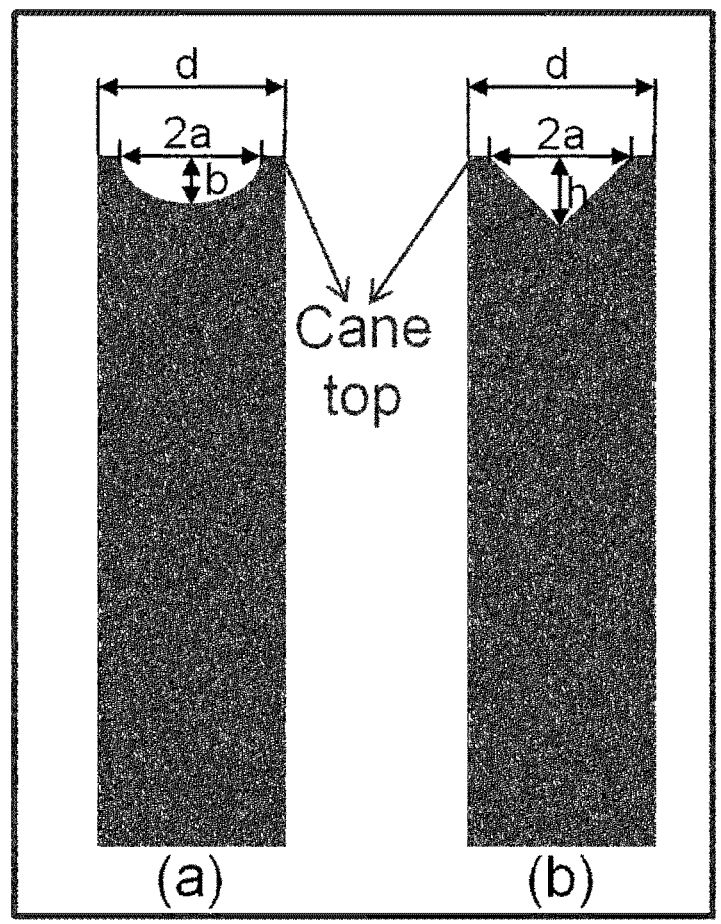
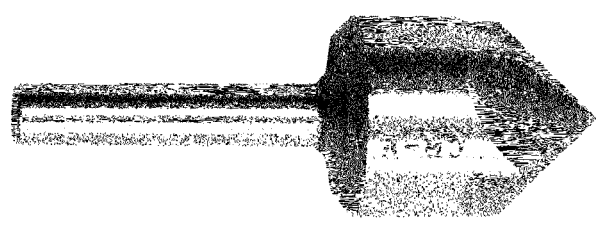
(c)

Figure 17
(a)
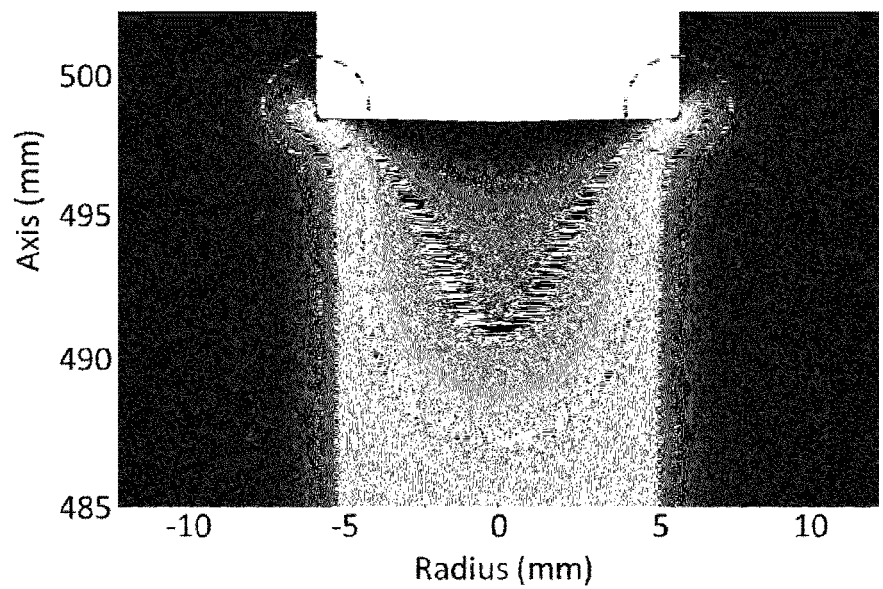
(b)
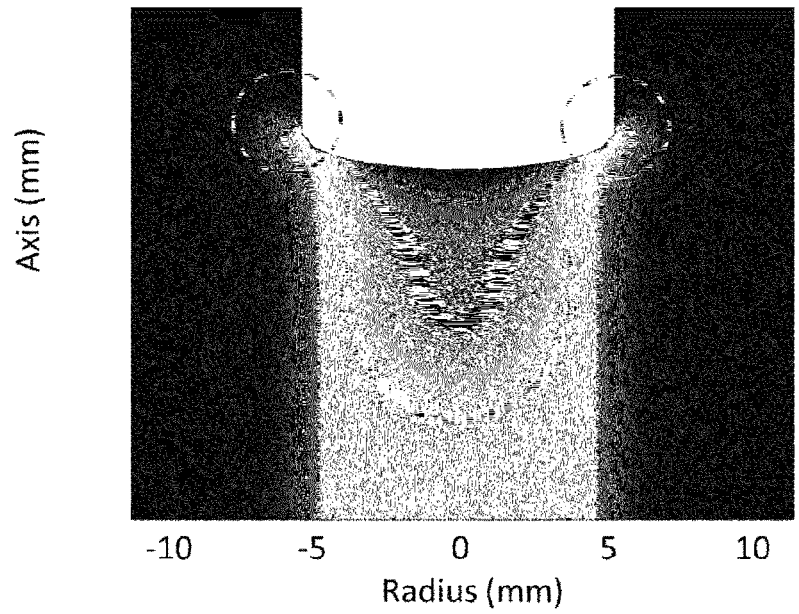

Figure 17
(c)
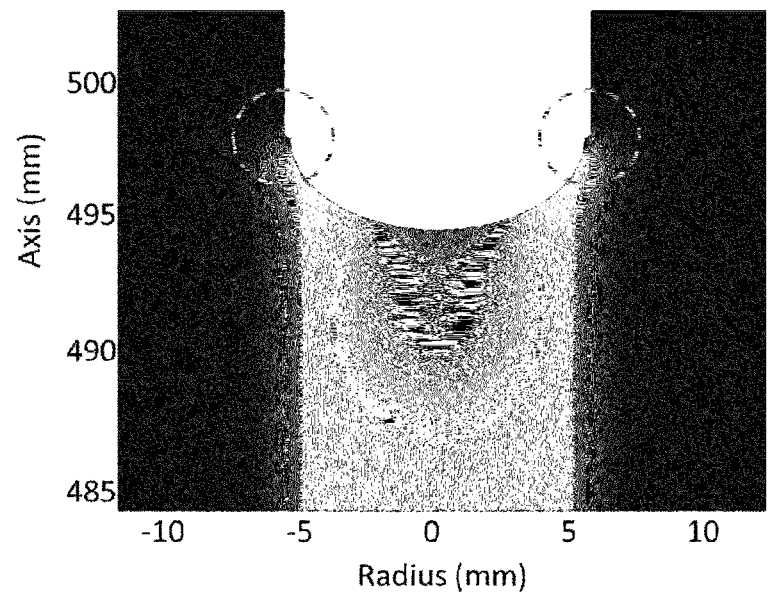
(d)
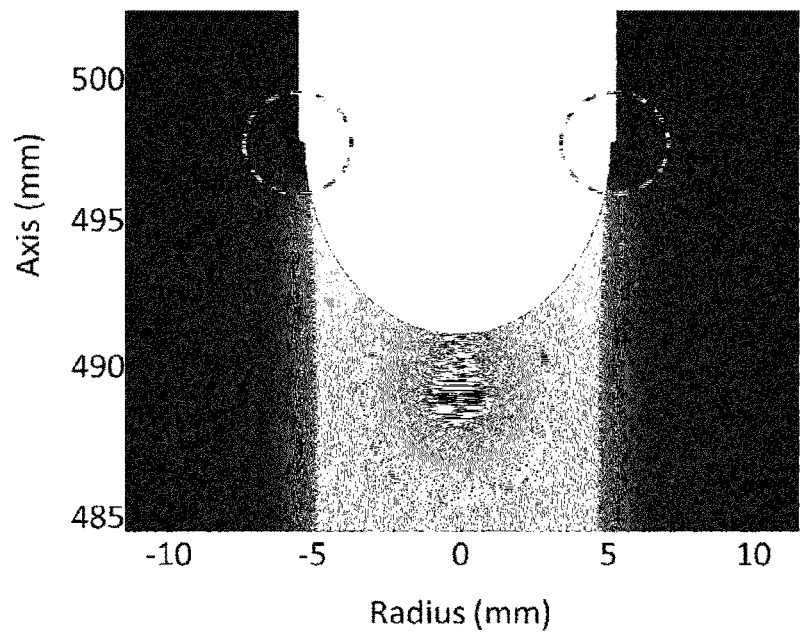

METHOD OF ASSEMBLING OPTICAL FIBER PREFORMS

This application claims the benefit of priority under 35 U.S.C. § 119 of U.S. Provisional Application Ser. No. 62/238,381 filed on Oct. 7, 2015 the content of which is relied upon and incorporated herein by reference in its entirety.

FIELD

This description relates to preforms used to make optical fibers. More particularly, this description relates to optical fiber preforms made by a cane-in-soot process. Most particularly, this description relates to crack-free optical fiber preforms with large core-clad ratio.

BACKGROUND

Optical communication systems are becoming increasingly important for data transmission because they offer high transmission speeds and high bandwidth. The success of optical communication systems depends critically on the quality of optical fibers used in data transmission systems. Optical fibers must transfer optical data signals with high fidelity and low attenuation.

Optical fibers are made by drawing fibers from a preform. The preform is consolidated silica glass that typically includes a series of concentric regions of silica glass that differ in the level or type of dopant. Control of the spatial distribution, concentration, and/or type of dopant in the fiber preform creates regions that differ in refractive index. The differences in refractive index are manifest in fibers drawn from the preform and define the different functional regions of an optical fiber (e.g. core vs. cladding, low index depressions, tailored index profiles).

One conventional process for making optical fiber preforms is an outside vapor deposition process that entails deposition of silica (or doped silica) soot onto a silica (or doped silica) cane. The cane is fully consolidated glass with a generally cylindrical geometry and becomes the central portion of the fiber preform. The cane has the composition desired for the high index core region of the fiber ultimately drawn from the preform (and for this reason is often referred to as the core cane). The silica soot surrounds the cane and can be deposited as a single layer with a single composition or a series of layers that differ in composition, where the compositions of the one or more layers are designed to provide the index profile desired in the cladding region of the fiber ultimately drawn from the preform. The one or more soot cladding layers typically include undoped silica and doped silica layers that differ in concentration or type of dopant.

Cladding soot is usually produced by flame reaction of one or more precursors. The flame reaction may be flame hydrolysis or flame combustion. In flame hydrolysis, water is present as a reactant and reacts with a soot precursor to form cladding soot. In flame combustion, water is not a reactant, but may be produced as a byproduct. Common precursors for silica soot include $SiCl_4$ and OMCTS (octamethylcyclotetrasiloxane). The presence of water in the soot deposition reaction can lead to high concentrations of OH in the silica soot and at the surface and near-surface region of the cane. To reduce the concentration of OH groups, a dehydration step is performed after soot deposition. In the dehydration step, the soot and cane are exposed to a dehydration agent (e.g. $Cl_2$) that acts to remove OH. The high porosity of the as-deposited soot facilitates removal of OH from the soot layer in the dehydration step. The densified nature of the cane, however, inhibits penetration of the cane by the dehydration agent and significant amounts of OH can remain in the cane portion of the preform. The presence of OH in the preform leads to incorporation of a high concentration of OH in fibers drawn from the preform and to undesirably high fiber attenuation losses for optical signals at or near 1380 nm due to a broad OH absorption band that extends from ~1350 nm to 1425 nm.

Since the optical signal in a transmission fiber is confined primarily to the core region, it is especially important to minimize the OH concentration in the fiber core, which requires minimization of the OH concentration in the core cane (the region of the fiber preform from which the fiber core is drawn). The typical strategy used to minimize the presence of OH in the core cane is to localize the high index region toward the center of the core cane. The high index region of the core cane is typically formed from updoped silica (e.g. Ge-doped silica) and the region of updoping is limited to a central portion of the core cane. The objective is to maintain the updoped region at a sufficient distance from the outer radial boundary of the core cane to protect the high index region from OH contamination. The portion of the core cane between the central updoped region and outer radial boundary acts as a buffer to inhibit diffusion of OH formed on the surface of the core cane. Because of the consolidated state of the core cane, diffusion of OH from the surface to the center of the core cane does not occur on practical time scales and OH is localized at the surface and near surface regions of the core cane. By positioning the high index region in the interior of the core cane at a sufficient distance from the near surface region, the presence of OH in the high index region can be minimized and attenuation losses due to OH absorption are avoided.

The high index region is typically centered in the core cane and the radial extent of the high index region can be quantified by the core-clad ratio of the core cane. The core-clad ratio is defined as the ratio of the radius of the high index region to the outer radius of the core cane. A core-clad ratio of 0.5, for example, signifies that the radius of the high index (updoped) region of the core cane is half the total radius of the core cane. In the conventional outside vapor deposition process, the core-clad ratio is kept small (e.g. <0.33) to minimize the presence of OH in the updoped region of the preform and in the core of fibers drawn from the preform. Utilization of core canes with a low core-clad ratio, however, is not economical from a process perspective because of the time and material costs required to enlarge the core cane beyond the dimensions of the updoped region.

The cane-in-soot process is an alternative method for making fiber preforms that avoids exposure of the core cane to water. In the cane-in-soot process, a core cane and soot cladding monolith are formed in separate processes and subsequently joined to form a core-cladding assembly that is consolidated to form a preform. The soot cladding monolith is porous and includes an internal cavity in which the core cane is placed. Consolidation densifies the porous soot cladding monolith and fuses the core cane to the soot cladding monolith to form an integral body that can be used as a fiber preform. Because the core cane and soot cladding monolith are formed independently, the core cane is not exposed to water reactants or byproducts present in the cladding soot deposition process. The core cane can be formed, dehydrated and consolidated in an environment free of water. Similarly, the soot cladding monolith can be deposited and dehydrated while in a porous state to essentially eliminate OH before joining of the core cane with the soot cladding monolith. Insertion of the core cane into the internal cavity of the porous soot cladding monolith occurs in the absence of water. Concerns over incorporation of OH into the high index region of the core cane are thus alleviated and fibers with low attenuation can be produced.

Because the core cane is protected from water, the cane-in-soot process improves process efficiency by enabling the use of core canes having large core-clad ratios. Practical implementation of the cane-in-soot process, however, reveals the formation of defects in preforms made in the cane-in-soot process from core canes having large core-clad ratios. The defects are believed to originate from stresses that develop during cooling of the preform after consolidation in the cane-in-soot process. It would be desirable to develop a cane-in-soot process that permits formation of fiber preforms without defects from core canes having a large core-clad ratio.

SUMMARY

The present disclosure provides optical fiber preforms formed from core canes having large core-clad ratio, intermediate core-cladding assemblies, and methods for making the preforms and core cladding assemblies. The preforms are made from core canes having a contoured end surface. The contoured end surface(s) include a depression that acts to reduce the stress that develops at the junction of the end surface of the core cane with a soot cladding monolith arising from differences in the coefficient of thermal expansions of the core can and soot cladding monolith. The contoured end surface(s) leads to preforms having low defect concentration and low probability of failure during fiber draw.

The present disclosure extends to:
A core-cladding assembly comprising:
a porous soot cladding monolith, said porous soot cladding monolith including a first porous cladding glass layer surrounding an internal cavity, said porous soot cladding monolith having a first coefficient of thermal expansion, said internal cavity including a first entrance;
a consolidated glass body positioned in said internal cavity, said consolidated glass body having a second coefficient of thermal expansion and a first end surface within said internal cavity, said first end surface facing said first entrance and including a first depression.

The present disclosure extends to:
An optical fiber preform comprising a core cane surrounded by a cladding, said cladding in direct contact with said core cane, said preform including a junction at the interface between said core cane, said cladding, and a gas, said junction having a radial tensile stress less than 100 MPa The present disclosure extends to:
A method of producing an optical fiber comprising:
providing a porous soot cladding monolith, said soot cladding monolith including a first porous glass cladding layer and having an internal cavity, said internal cavity including a first entrance; and
inserting a core cane into said internal cavity to form a core-cladding assembly, said core cane including a first end surface, said first end surface including a first depression and facing said first entrance.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

FIG. 16 shows cores canes having an end surface with (a) an ellipsoidal depression and (b) a conical depression as well as (c) a cutting tool for forming conical depressions.

FIG. 17 depicts the radial tensile stress distribution in the vicinity of the end surface of a core cane in a consolidated fiber preform made by the cane-in-soot process for (a) a core cane with a flat end surface and (b)-(d) a core cane with ellipsoidal depressions of various sizes.

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1A:
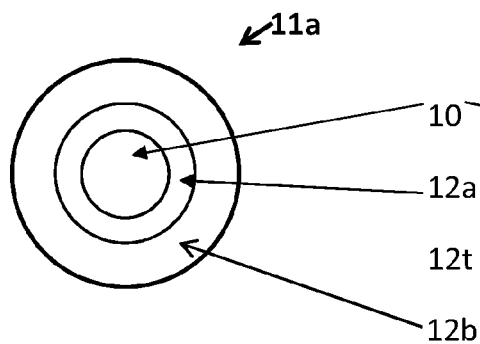
FIG. 1A is a diagram illustrating an up-doped overclad profile for making a low bend loss optical fiber.

Reference will now be made in detail to illustrative embodiments of the present description.

As used herein, the term "soot" means $SiO_2$ or doped-$SiO_2$ particles; the individual soot particles generally have a size of 0.01 to 10 micrometers in diameter. "Soot preform" means an article made of soot particles that has an open porosity. The terms "porous soot" and "porous glass" are used interchangeably herein. The term "core portion" or "core cane" refers to consolidated glass and may comprise a silica or doped silica glass. The term "consolidated glass" refers to glass in a closed pore state. In some embodiments, the glass is void-free. The term "soot-to-glass transformation" refers to the process of going from a porous glass state to a closed porosity state. As described more fully hereinbelow, the soot-to-glass transformation process may include a dehydration step, a doping step, and a sintering step. In some embodiments, the glass becomes void-free in the soot-to-glass transformation process. The term optical fiber preform (or consolidated preform, sintered preform or blank) refers to a glass article from which an optical fiber can be drawn.

As used herein, "up-dopant" refers to a dopant that raises the refractive index of a silica ("$SiO_2$") glass relative to that of pure undoped $SiO_2$, that is, the up-dopant causes the glass refractive index to increase. The term "down-dopant" refers to a dopant that lowers the refractive index of a silica glass relative to that of pure undoped $SiO_2$ glass. Examples, without limitation, of up-dopants include Ge, Al, P, Ti, Cl, and Br. Examples, without limitation, of down-dopants include non-periodic voids, fluorine and boron. Dopant concentrations in the preform and/or fiber are expressed herein on the basis of weight (e.g., ppm by weight, ppm (by weight), percent by weight, wt %).

"Relative refractive index," as used herein, is defined in Eq. 1 as:

$$\Delta_i(r_i)\% = 100\frac{(n_i^2 - n_{ref}^2)}{2n_i^2} \quad \text{Eq. 1}$$

where $n_i$ is the refractive index at radius unless otherwise specified, and $n_{ref}$ is the refractive index of pure silica glass, unless otherwise specified.

As used herein, "dehydration atmosphere" or "drying atmosphere" refers to a gas atmosphere that contains a "drying gas". "Drying gas", as used herein, refers to a gas or gas mixture including a desired and suitable drying agent. A drying agent is a compound for drying that acts by removing water and/or hydroxyl ions present in a soot preform. Exemplary drying agents without limitation include: $CCl_4$ $Cl_2$, $Br_2$, $SOCl_2$, CO, and $SiCl_4$. For example and without limitation, a "drying gas" may be He, a mixture of He and $N_2$, and one of $Cl_2$, $CCl_4$, $SiCl_4$, and/or other drying agents. In some embodiments the drying gas includes a drying agent selected from the group consisting of $Cl_2$ and $SiCl_4$. Concentrations of components in the gas phase are expressed herein on the basis of volume (e.g., ppm by volume, ppm (by volume), percent by volume, vol %).

As used herein, "consolidation" or "soot-to-glass consolidation" refers to heating a soot preform to temperatures of at least about 800° C. to perform various process steps such as drying, doping and sintering. In one embodiment, consolidation occurs over a temperature range of 800° C. to 1550° C. The stage of consolidation at which the soot preform is heated at temperatures below 1050° C. may be referred to herein as the pre-heat step or pre-heating step of consolidation. The pre-heating and intermediate heating steps may be combined in a single step or may be performed sequentially. The stage of consolidation at which the soot preform is heated to a temperature of at least 1300° C. may be referred to herein as the sinter step or sintering step of consolidation. The sintering step may occur at a temperature in the range from 1300° C. to 1550° C., or at a temperature above 1550° C. It is expected that densification of the soot to form glass (e.g. to form vitreous or fused silica, or a doped fused silica) occurs primarily in the sintering step (but may also occur at the intermediate heating step and/or the preheating step). Doping the preform with chlorine using chlorine gas or a chlorine-containing dopant precursor may occur during one or more of the pre-heating step, intermediate heating step, and sintering step.

As used herein, "cladding" refers to a glass layer or a plurality of glass layers surrounding an optical fiber core and extending from the outer edge of the core to the outer edge of the optical fiber; and the term "overclad" or "outer clad" and similar terms refer to the last cladding layer on the optical fiber (the outermost, most radially distant cladding layer).

The core-clad ratio is defined herein as the ratio of the radius of the high index region of the core cane to the outer radius of the core cane.

As used herein, contact refers to direct contact or indirect contact. Direct contact refers to contact in the absence of an intervening material and indirect contact refers to contact through one or more intervening materials. Elements in direct contact touch each other. Elements in direct contact with each other may be referred to as being adjacent to each other. Elements in indirect contact do not touch each other, but do touch an intervening material. Elements in contact may be rigidly or non-rigidly joined.

The present disclosure is described more fully below with reference to the accompanying drawings. However, this disclosure may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2A:
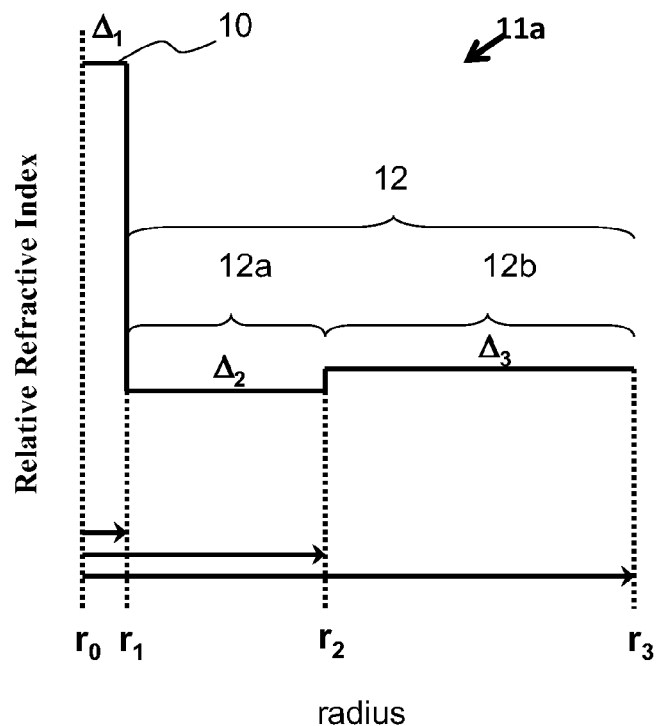
FIG. 2A is an exemplary relative refractive index profile of the optical fiber illustrated in FIG. 2A, the core extending from $r_0$ to $r_1$ and having an index $\Delta_1$, the inner cladding extending from $r_1$ to $r_2$ and having an index $\Delta_2$, and the over cladding extending from $r_2$ to $r_3$ and having an index $\Delta_3$.

Optical fibers generally consist of a core fiber for transmission of light and one or more cladding layers whose purpose is to keep the transmitted light within the core and reduce the transmission loss over distance. An exemplary step index optical fiber is shown in FIG. 1A. The optical fiber 11a includes a core 10, an inner cladding 12a and an outer cladding 12b. A relative refractive index profile for the optical fiber 11a of FIG. 1A is shown in FIG. 2A. The core 10 extends radially from a core center $r_0$ to a core outer edge $r_1$ and has an index $\Delta_1$. The inner cladding 12a extends radially from the core outer edge $r_1$ to the radial distance $r_2$ and has an index $\Delta_2$. The outer cladding 12b extends radially from $r_2$ to the outer edge of fiber at $r_3$ and has an index $\Delta_3$.

Figure 1B:
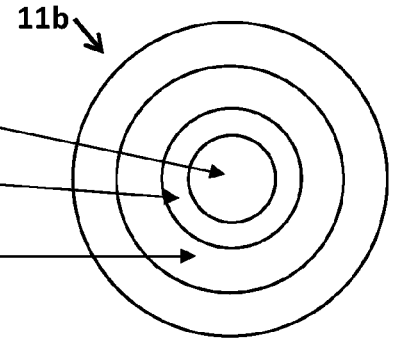
FIG. 1B is a diagram illustrating an up-doped overclad profile with trench for making a low bend loss optical fiber.
Figure 2B:
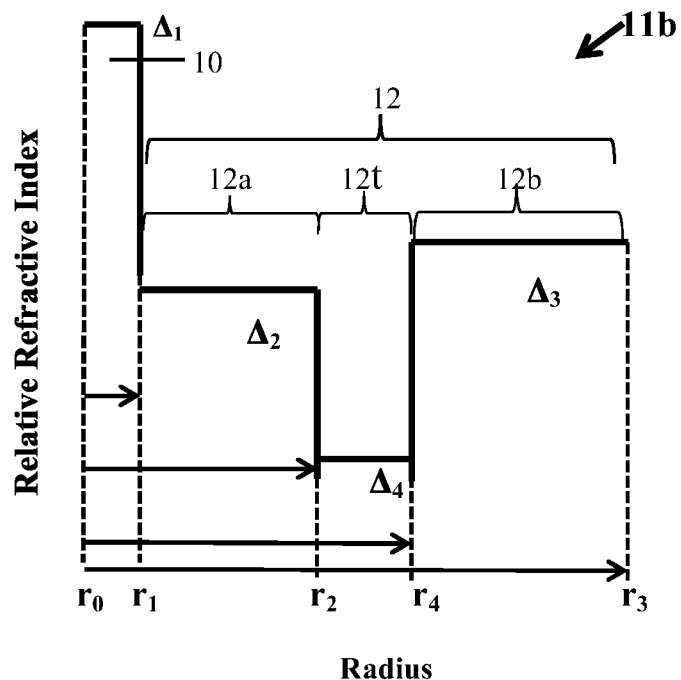
FIG. 2B is an exemplary relative refractive index profile of the optical fiber illustrated in FIG. 2B, the core extending from $r_0$ to $r_1$ and having an index $\Delta_1$, the inner cladding extending from $r_1$ to $r_2$ and having an index $\Delta_2$, a trench of a low refractive index material extending from $r_2$ to $r_4$, and having a refractive index of $\Delta_4$ and the over cladding extending from $r_4$ to $r_3$ and an index $\Delta_3$.

It will be appreciated from the description herein that optical fibers of alternative suitable constructions can be formed in accordance with the present invention. In some embodiments, there is a trench region designated 12t between the inner and outer cladding regions. A trench region reduces the sensitivity of the optical fiber to bending loss. An example of such a profile is shown as optical fiber 11b in FIG. 1B, which has the relative refractive index profile shown in FIG. 2B. In FIG. 2B, the core 10 extends radially from a core center $r_0$ to a core outer edge $r_1$ and has an index $\Delta_1$. The inner cladding 12a extends radially from the core outer edge $r_1$ to the radial distance $r_2$ and has an index $\Delta_2$. The trench region 12t extends radially from $r_2$ to $r_4$ and has an index $\Delta_4$. The outer clad region 12b extends radially from $r_4$ to the outer edge of fiber at $r_3$ and has an index $\Delta_3$. The index $\Delta_3$ of the outer clad region is higher than the index in the inner cladding region $\Delta_2$ as a result of updoping of the outer cladding region or downdoping of the inner cladding region. The index $\Delta_4$ of trench region 12t is achieved by doping the region with a down-dopant.

The present description provides optical fiber preforms made from core canes having a large core-clad ratio, intermediate core-cladding assemblies used to make the optical fiber preforms, a process for making the preforms, and optical fibers drawn from the preforms.

The optical fiber preform includes a core cane and one or more cladding layers that circumscribe the core cane. The preform is formed by processing a core-cladding assembly. Processing may include dehydrating, doping and/or sintering of the core-cladding assembly. The core-cladding assembly includes a core cane and a soot cladding monolith, where the soot cladding monolith is formed independent of the core cane and includes one or more porous cladding layers. The soot cladding monolith may include an internal cavity and the core-cladding assembly may be formed by inserting the core cane into the internal cavity. Sintering consolidates the porous cladding layers of the core-cladding assembly to achieve densified cladding layers that are fused to the core cane to form the optical fiber preform The optical fiber preforms are made from a cane-in-soot process that minimizes formation of defects. The optical fiber preforms are essentially defect free and can withstand reheating to fiber draw temperatures without cracking. In the cane-in-soot process, a core cane and soot cladding monolith are formed independent of each other. The core cane is a consolidated glass body. The soot cladding monolith is porous and includes an internal cavity. At least a portion of the core cane is inserted into the internal cavity to form a core-cladding assembly. The core-cladding assembly is an intermediate structure that is subsequently consolidated to form an optical fiber preform.

Figure 3:
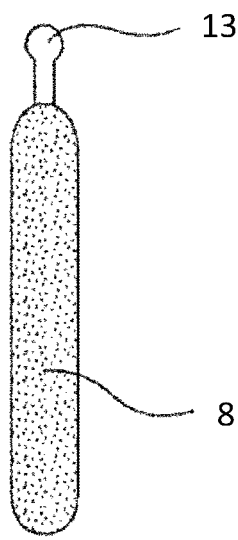
FIG. 3 is a frontal view of a core soot preform formed using a method according to embodiments of the present invention.

Fabrication of the core cane may begin with formation of a core soot preform. FIG. 3 shows exemplary core soot preform 8 with handle 13. The core soot preform 8 may be formed using any suitable method, such as chemical vapor deposition (CVD) (e.g., outside vapor deposition (OVD), vapor axial deposition (VAD), modified chemical vapor deposition (MCVD), plasma chemical vapor deposition (PCVD)) or any other suitable technique such as sol-gel processing or flame hydrolysis. The core soot preform 8 may be formed from pure silica or doped silica (for example, silica doped with a suitable dopant or dopants including, but not limited to, germania, boron, fluorine, aluminum, titanium, phosphorous, and/or chlorine). Doping may be used to control the refractive index of the core soot preform. The refractive index profile of the core cane may be a constant profile, a step index profile, or a monotonically varying profile (e.g. α-profile or super Gaussian profile). The core soot preform may be formed as a single layer or multilayer body, where the one or more layers may be doped, undoped and if doped, the one or more layers may include differences in the type, concentration, or distribution of dopants. The core soot preform 8 is a porous structure defining a plurality of interstices. The core soot preform 8 may include a passage extending the full length thereof from which a mandrel of the deposition apparatus has been removed. According to some embodiments, the core soot preform 8 has a density of no greater than about 1.0 g/cc, preferably of no more than about 0.7 g/cc, and more preferably of no more than about 0.6 g/cc.

The core soot preform 8 is consolidated to form a consolidated core glass preform and the consolidated core glass preform is drawn to form a core cane. The consolidation of the core soot preform 8 includes sintering and may include other process steps such as drying and/or doping. The consolidation of the core soot preform 8 may employ any suitable or desired processes or parameters consistent with the methods described herein. Suitable apparatus for consolidating the core soot preform 8 and drawing the consolidated core soot preform are known to those of skill in the art. The soot cladding monolith is formed independent of the core cane.

By forming the soot cladding monolith independent of the core cane, the core cane is not exposed to water present as a reactant or byproduct in the deposition reaction or post-deposition processing of the soot cladding. Exclusion of water from the core cane leads to a reduction in hydroxyl content of the core portion of the fiber preform and in fibers drawn from the preform. As a result, attenuation at 1380 nm due to hydroxyl absorption is greatly reduced.

The soot cladding monolith may be formed by depositing one or more layers of silica soot or doped silica soot on a substrate and removing the substrate to provide the soot cladding monolith. The substrate may be a bait rod. The cladding soot (or layers thereof) may be formed of pure silica or doped silica (for example, silica doped with a suitable dopant or dopants including, but not limited to, germania, boron, fluorine, aluminum, titanium, phosphorous, and/or chlorine). As indicated hereinabove, the cladding soot may include multiple layers that differ in doping and refractive index to provide fiber index profiles that include multiple cladding regions such as those shown in FIGS. 2A and 2B.

In the following discussion, fabrication of a soot cladding monolith having three porous soot cladding layers is described. It is recognized, however, that the procedure outlined is generally applicable to a soot cladding monolith having any number of porous soot cladding layers.

Figure 4:
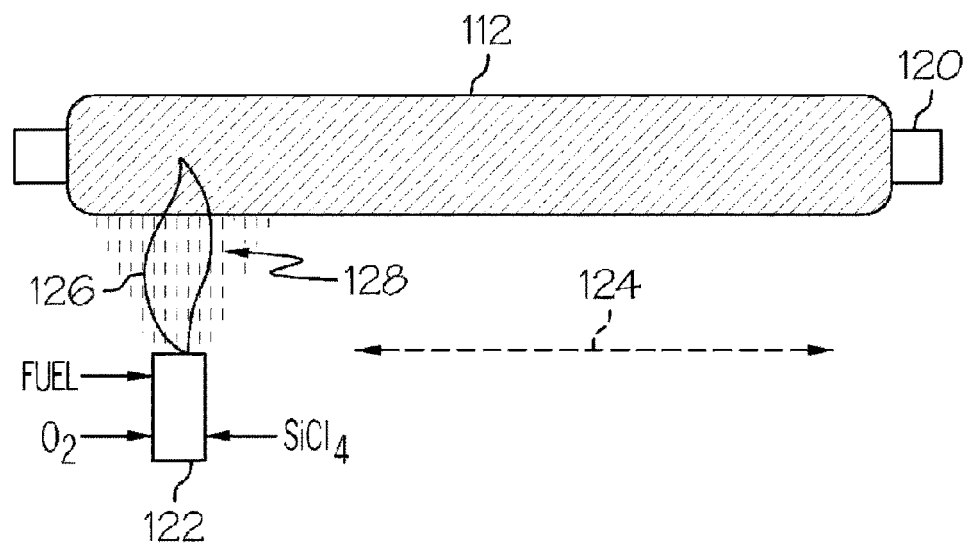
FIG. 4 depicts deposition of a soot layer on a bait rod.

FIG. 4 illustrates deposition of a silica-based soot layer 112 on bait rod 120. The silica-based glass soot is formed by providing a vapor phase silica-based glass precursor material, such as $SiCl_4$ or octamethylcyclotetrasiloxane (OMCTS), to a burner 122. The gas-fed burner 122 is supplied with fuel, such as $H_2$, $CH_4$, $D_2$ (deuterium), $CD_4$ or CO. Oxygen is also provided to burner 122 and the fuel and oxygen are combusted to create flame 126. In some embodiments, the vapor phase silica-based glass precursor material is $SiCl_4$ and the gas-fed burner 122 is supplied with a non-hydrogenated fuel such as $D_2$, $CD_4$ or CO in order to limit the amount of residual OH in the deposited silica-based glass soot. The vapor phase silica-based glass precursor material may be delivered to the burner at a flow rate from about 4 L/min to about 10 L/min, while the fuel may be supplied to the burner at a flow rate from about 10 L/min to about 40 L/min.

The vapor phase silica-based glass precursor material is reacted in the flame 126 to produce silica-based glass soot 128, which is deposited as soot layer 112 on bait rod 120 as the bait rod is rotated. The rotation rate may be from about 50 rpm to about 400 rpm. Soot layer 112 may have the same, higher, or lower refractive index than undoped silica. Higher or lower refractive indices may be achieved by supplying an updopant or downdopant precursor to burner 122. Soot layer 112 may constitute a single-layer soot cladding monolith or may constitute the innermost (smallest radius) layer of a multilayer soot cladding monolith. The flame 126 of the gas-fed burner 122 is traversed back and forth along the axial length of the bait rod 120 as indicated by arrow 124 as the bait rod is rotated thereby building up silica-based glass soot and forming soot layer 112 on the bait rod 120.

Figure 5:
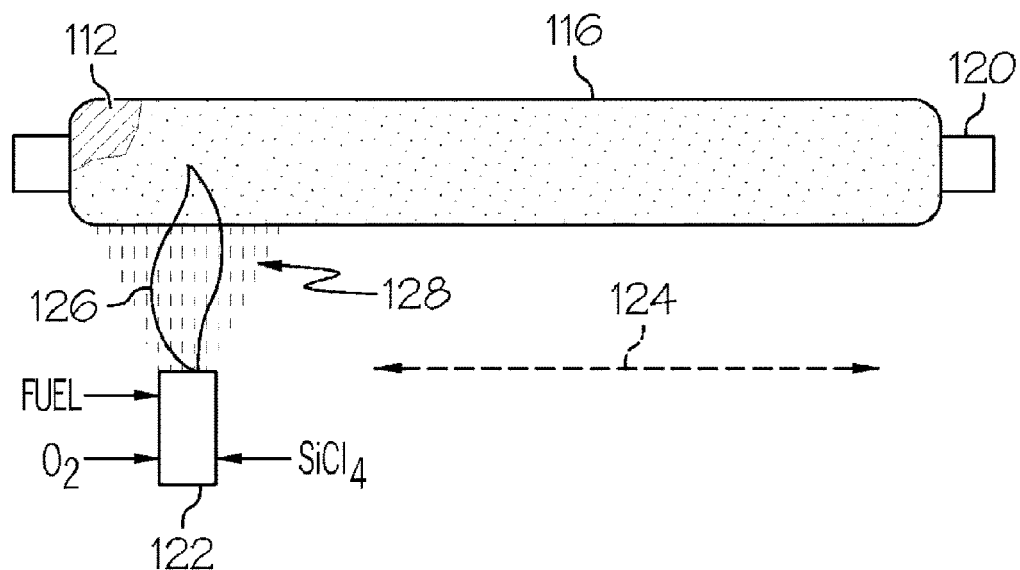
FIG. 5 depicts deposition of a second soot layer on the soot layer shown in FIG. 4.

FIG. 5 depicts deposition of soot layer 116 on soot layer 112. Soot layer 116 may be formed in a similar manner as soot layer 112. For example, a vapor phase silica-based glass precursor material, such as $SiCl_4$ or OMCTS, may be supplied to the gas-fed burner 122 and reacted in the flame 126 to form silica-based glass soot which is deposited as soot layer 116 on soot layer 112 as the bait rod is rotated. Soot layer 116 may have the same, higher, or lower refractive index than soot layer 112. To achieve a preform that enables drawing of a fiber with the two-layer cladding region of FIG. 2A, for example, soot layer 112 may be undoped silica and soot layer 116 may be updoped silica. Soot layer 116 may constitute an outer layer of a two-layer soot cladding monolith or an intermediate layer of a soot cladding monolith having three or more layers.

Figure 6:
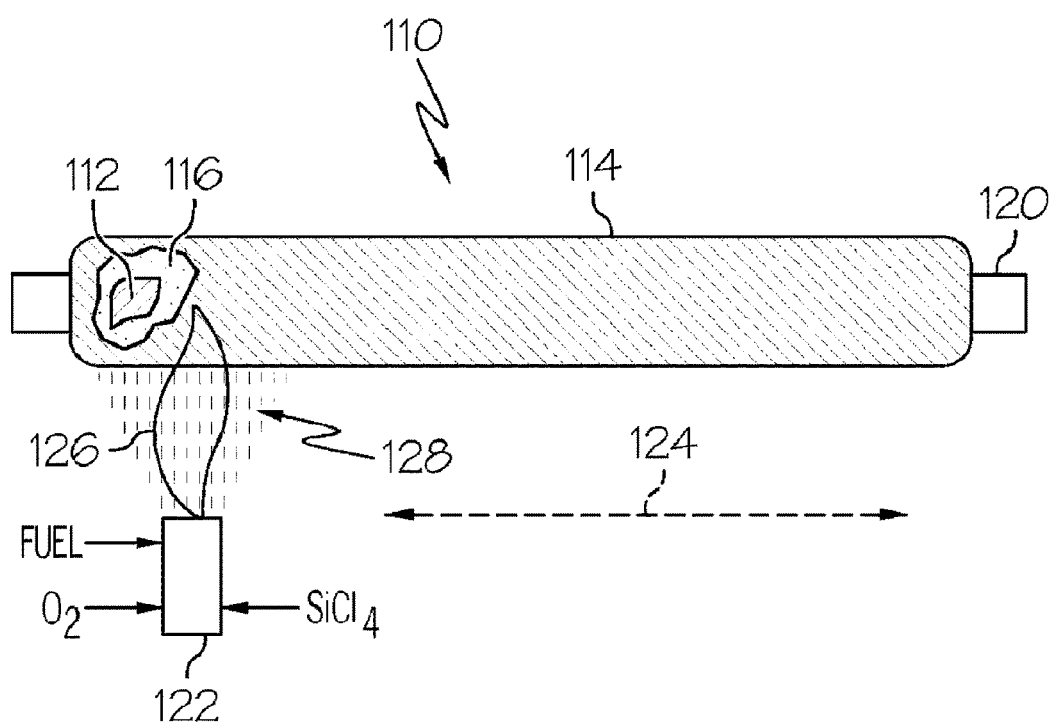
FIG. 6 depicts deposition of a third soot layer on the soot layer shown in FIG. 5.

FIG. 6 depicts deposition of soot layer 114 on soot layer 116. Soot layer 114 may be formed in a similar manner as soot layer 112 or soot layer 116. For example, a vapor phase silica-based glass precursor material, such as $SiCl_4$ or OMCTS, may be supplied to the gas-fed burner 122 and reacted in the flame 126 to form silica-based glass soot which is deposited as soot layer 114 on soot layer 116 as the bait rod is rotated. Soot layer 114 may have the same, higher, or lower refractive index than soot layer 116 or soot layer 112. To achieve a preform that enables drawing of a fiber with the three-layer cladding region of FIG. 2B, for example, soot layer 112 may be undoped silica, soot layer 116 may be downdoped silica, and soot layer 114 may be updoped silica. Soot layer 114 may constitute an outer layer of a three-layer soot cladding monolith or an intermediate layer of a soot cladding monolith having four or more layers. Additional layers of may be deposited similarly to obtain a soot cladding monolith having any desired number of layers.

Process conditions used to form the different layers of a multilayer soot cladding monolith may be the same or different. Process variables include flame temperature, flow rates of precursors for silicon or dopants, traversal rate of the burner along the length of the bait substrate, and rotation rate of the bait substrate. Variations in process conditions can control the deposition rate of soot and density of soot in the as-deposited state. The flame temperature may be 1500° C. or higher. Higher flame temperatures promote higher as-deposited soot density. Conversely, lower flame temperatures lower as-deposited soot density.

Soot density may also be influenced by the rate of traversal of the burner along the bait substrate. The traversal rate of the flame may be greater than 0.1 cm/sec, or greater than 0.25 cm/s or greater than 0.5 cm/s, or greater than 1 cm/s, or greater than 2 cm/s, or greater than 3 cm/s. Faster traversal rates may lead to less dense, more porous soot layers in the as-deposited state. Conversely, slower traversal rates may lead to denser, less porous soot layers in the as-deposited state. The density of the as-deposited soot layer may be less than 1.0 $g/cm^3$, or less than 0.8 $g/cm^3$, or less than 0.6 $g/cm^3$, or less than 0.5 $g/cm^3$. The density of the as-deposited soot layer may be greater than 1.0 $g/cm^3$, or greater than 1.25 $g/cm^3$, or greater than 1.5 $g/cm^3$, or greater than 1.75 $g/cm^3$ or greater than 2.0 $g/cm^3$.

The density of the as-deposited soot layer may also be influenced by the delivery rate of the soot precursor to the burner. The flow rate of silica-based soot precursors may be in the range from 0.1 L/min to 20 L/min. Lower flow rates promote the formation of soot layers having higher density in the as-deposited state. Conversely, higher flow rates promote the formation of soot layers having lower density in the as-deposited state.

The density of the as-deposited soot layer may also be influenced by the rate of rotation of the bait rod during soot deposition. Decreasing the rate of rotation of the bait rod may assist in increasing the density of the as-deposited soot layer. Conversely, increasing the rate of rotation of the bait rod may assist in decreasing the density of the as-deposited soot layer.

In one embodiment, the soot cladding monolith includes two soot layers, where the outer layer has a higher density than the inner layer. In another embodiment, the soot cladding monolith includes three soot layers, where an intermediate soot layer is positioned between an inner soot layer and outer soot layer and where the intermediate soot layer has a higher density than the inner soot layer. In still another embodiment, the soot cladding monolith includes four or more soot layers, where two or more intermediate soot layers are positioned between an inner soot layer and outer soot layer and where at least one of the intermediate soot layers has a higher density than the inner soot layer.

Once the desired number and type of soot cladding layers has been deposited, the bait rod is removed to provide a soot cladding monolith. The space occupied by the bait rod forms an internal cavity of the soot cladding monolith.

In the cane-in-soot process, the core cane is inserted in the internal cavity of the soot cladding monolith to form a core-cladding assembly.

Figure 7:
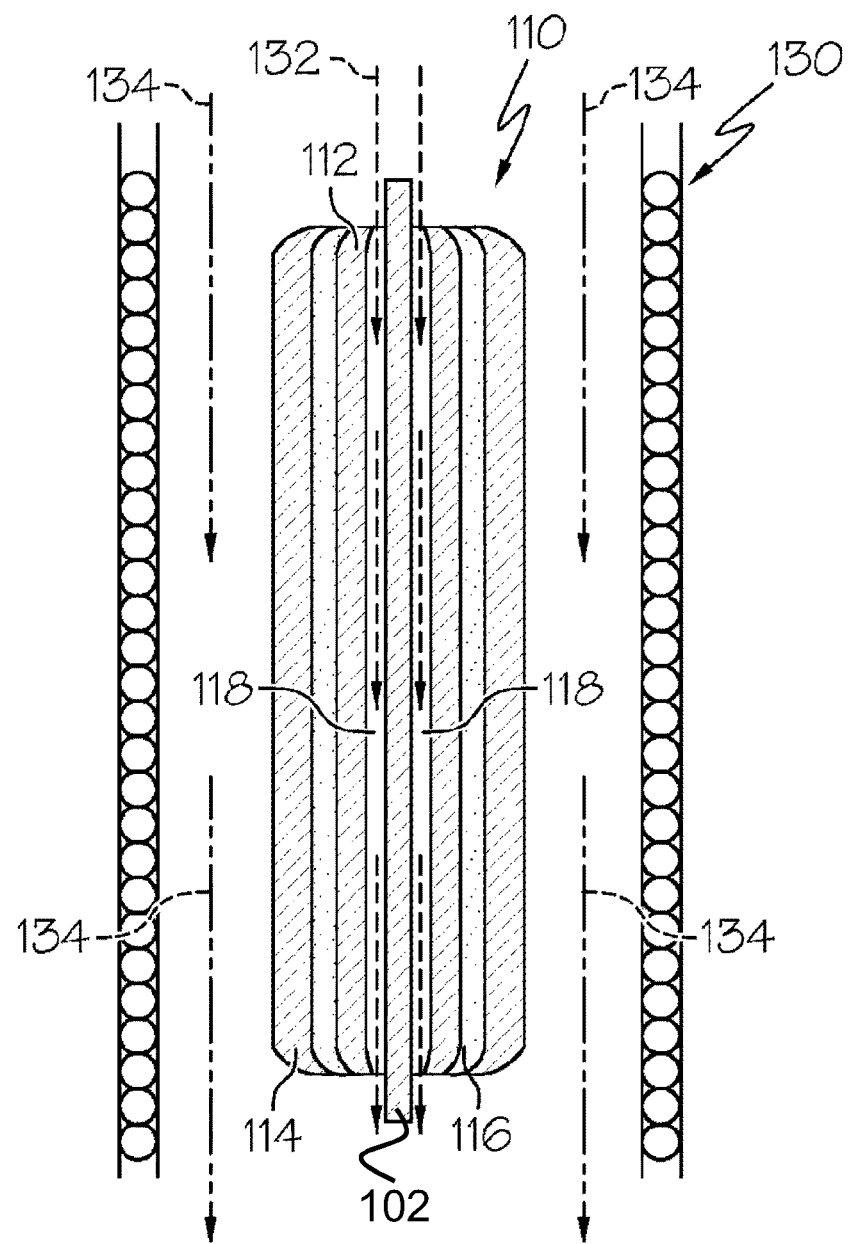
FIG. 7 depicts processing of a core-cladding assembly that includes a consolidated core cane inserted into an internal cavity of a three-layer soot cladding monolith.

FIG. 7 shows placement of soot cladding monolith 110 in consolidation furnace 130. Soot cladding monolith 110 corresponds to the three-layer soot structure shown in FIG. 6 after removal of bait rod 120 and includes a series of concentric soot layers 112, 116, and 114 as described above. Soot cladding monolith 110 further includes internal cavity 118. In the embodiment of FIG. 7, internal cavity 118 extends through the entire length of soot cladding monolith 110. In other embodiments, internal cavity 118 extends only partially into soot cladding 110. Densified core cane 102 is inserted into internal cavity 118 to form a core-cladding assembly. The core-cladding assembly includes a gap between the outer surface of core cane 102 and the inner surface of soot cladding layer 112. The core-cladding assembly is processed in consolidation furnace 130.

The core-cladding assembly is processed in accordance with the methods described herein to form an optical fiber preform. As noted hereinabove, the processing includes consolidation and effects a soot-to-glass transformation of the one or more porous soot cladding layers of the core-cladding assembly. Processing may include a pre-heat step, an intermediate heating step, and a sintering step, where one or more of the pre-heat step, intermediate heating step, and sintering step may include treatment of the soot cladding preform with a reducing agent. Processing of the soot cladding preform may also include a drying step and a doping step.

In embodiments in which processing includes a drying step, the core-cladding assembly is treated with a drying agent. The drying step may be performed at a temperature of between about 800° C. and 1300° C., including in one or both of the pre-heating step and intermediate heating step described hereinabove. The drying agent penetrates the pores of the porous soot cladding layers of the core-cladding assembly and reacts with water or OH groups to remove water and OH groups from the porous soot cladding layers. The drying agent may also remove transition metals or other impurities that may be present in the porous soot cladding layers.

Referring to FIG. 7, the drying agent may enter the gap between the outer surface of core cane 102 and the inner surface of soot cladding layer 112 as indicated by flow path 132.

The drying agent may also enter pores within soot layers 112, 116, and 114, and may also surround or pass around the outer surface of soot cladding layer 114 as indicated by flow path 134. The flow rate of the drying agent through and/or around the core-cladding assembly may be in the range from about 1 L/min to about 40 L/min. The core-cladding assembly may be heated during dehydration. Heating may further the action of the drying agent and may promote removal of hydroxyl and water.

The temperature of dehydration may be in the range from about 500° C. to about 1300° C. and the time of dehydration may be in the range from 30 min to 10 hours. The temperature of dehydration is preferably less than the temperature needed to initiate sintering of the soot cladding monolith component of the core-cladding assembly. Premature sintering of the soot cladding monolith closes pores and blocks access of the dehydration agent to the interior of the soot cladding monolith and thus inhibits removal of hydroxyl and water. The drying agent may be removed from the environment surrounding the soot cladding monolith and/or core-cladding assembly upon conclusion of dehydration.

Suitable drying agents include chlorine-containing gases such as $Cl_2$, $SiCl_4$, $GeCl_4$, $SOCl_2$, and/or $POCl_3$. The drying agent may optionally be diluted in an inert gas such as He, Ar, Ne and/or $N_2$. In one embodiment, the dehydration gas comprises a mixture of 2% to 6% chlorine gas in helium gas. In some embodiments, the drying gas contains less than about 5 volume % chlorine, such as between about 0.01 and 3.0 volume % chlorine.

In some embodiments, processing may include a doping step in which the core-cladding assembly is exposed to a dopant precursor. In one embodiment, the doping is performed during the pre-heat step of the soot-to-glass transformation process. In another embodiment, the doping is performed during the intermediate heating step. In still another embodiment, the doping is performed during the sintering step of the soot-to-glass transformation process. Doping preferably occurs while the cladding layers of the core-cladding assembly are sufficiently porous to permit diffusion or penetration of a dopant or doping precursor. In one embodiment, doping occurs after dehydration and before sintering.

In one embodiment, doping is accomplished by supplying a doping precursor to a flow pathway between the outer surface of the core cane and inner layer of the soot cladding monolith in the core-cladding assembly. For example, a doping precursor may be supplied to flow pathway 132 shown in FIG. 7. In another embodiment, doping is accomplished by supplying a doping precursor to a flow pathway adjacent to the outer surface of the outer soot layer of the soot cladding monolith component of the core-cladding assembly. For example, a doping precursor may be supplied to flow pathway 134 shown in FIG. 7.

When a doping precursor is supplied to porous soot layers of the soot cladding monolith component of the core-cladding assembly, it may enter the pores and deliver a dopant to the surface and/or throughout the interior of the soot layer. Doping may occur in multiple layers of the soot cladding monolith portion of the core-cladding assembly.

Sintering of the core-cladding assembly may occur after dehydration. The drying agent and/or dopant precursor may be removed from the ambient of the core-cladding assembly before initiation of sintering.

The sintering may consolidate the soot cladding monolith and fuse the soot cladding monolith with the core cane to form a consolidated fiber preform. During sintering, densification occurs as the pores of the soot cladding monolith collapse and the soot cladding monolith collapses and adheres to the core cane. The sintering temperature may be at least 1300° C., or at least 1350° C., or at least 1400° C., or at least 1450° C., or at least 1500° C. Higher sintering temperatures reduce the time of sintering.

Figure 8:
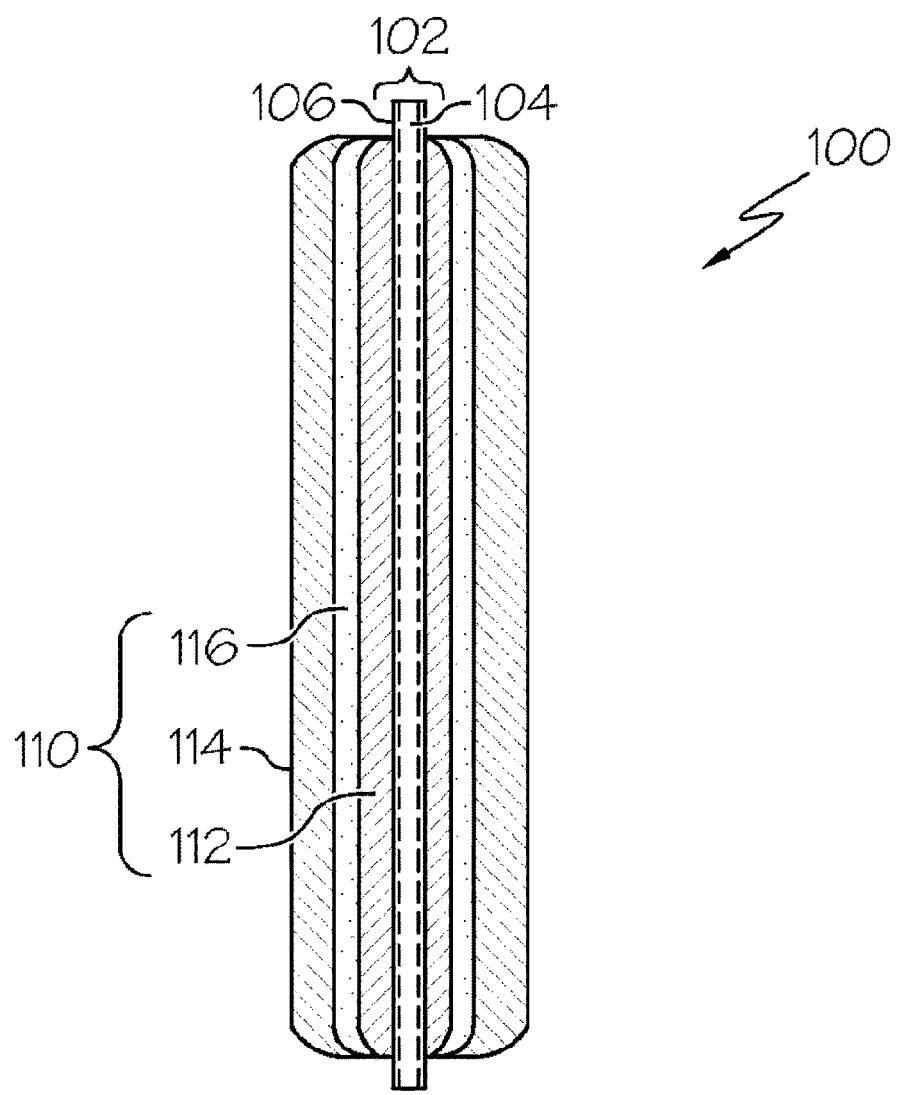
FIG. 8 depicts a fiber preform formed from the core-cladding assembly shown in FIG. 7.

Sintering may be accomplished in a consolidation furnace by forming a hot zone of sufficient temperature to induce sintering within the consolidation furnace and exposing the core-cladding assembly to a thermal cycle in the furnace where the temperature may range from 1400° C. to about 1500° C. Sintering the core-cladding assembly produces an optical fiber preform. FIG. 8 shows optical fiber preform 100 formed by sintering the core-cladding assembly of FIG. 7. The optical fiber preform is a solid piece of glass with a central core with one or more concentric regions surrounded by one or more concentric cladding regions.

An optical fiber can be drawn from the optical fiber preform. Suitable techniques and apparatus for drawing optical fiber from a consolidated glass preform are known to those of skill in the art. It will be appreciated that the consolidated glass core of the consolidated optical fiber preform will form the core (or a portion of the core) of the optical fiber and the consolidated cladding layers of the consolidated optical fiber preform will form the cladding portion of the optical fiber.

Inspection of optical fiber preforms prepared by the cane-in-soot process reveals the presence of defects that may lead to failure of the preforms during draw. The defects include cracks, which can lead to fracturing of the optical fiber preform early in the process of reheating to the temperature needed to melt the preform for fiber draw. As noted hereinabove, fabrication of optical fiber preforms using the cane-in-soot process includes consolidation of a core-cladding assembly at high temperatures. The optical fiber preform formed in the consolidation process is cooled to room temperature and stored until the time of fiber draw.

While not wishing to be bound by theory, it is believed that cooling of the optical fiber preform from the consolidation temperature to room temperature (or other lower temperature) leads to the formation of defects in the optical fiber preform. It is further believed that the defects originate from stresses that arise from differences in the coefficient of thermal expansion of the core cane and soot cladding monolith. As noted hereinabove, the core cane is typically formed from updoped silica, while the cladding is typically formed from undoped silica, downdoped silica, or a combination of undoped silica and downdoped silica. The compositional differences that exist between the materials used for the core cane and the soot cladding imply differences in thermal expansion coefficient that lead to differences in the rate or extent of contraction of the core and cladding regions of the optical fiber preform during the cooling process that follows consolidation. Differences in thermal contraction create stresses at the interface between the core cane and soot cladding monolith during cooling. It is believed that the stresses are sufficient to form defects, such as cracks or microcracks, in the optical fiber preform.

Formation of cooling-induced defects is expected to be especially pronounced when a core cane having a high core-clad ratio is used to form the optical fiber preform in the cane-in-soot process. In a core cane with a high core-clad ratio, the radius of the updoped (high index) region is a significant fraction of the total radius of the core cane. The large radial extent of the updoped region positions the boundary of the updoped region in close proximity to a compositionally mismatched soot cladding assembly and increases the stresses arising from differential contraction of the core and cladding regions of the optical fiber preform during cool down. If the core-clad ratio is one, for example, the core is directly adjacent to the cladding and differences in thermal expansion coefficient at the interface between the core cane and cladding are most pronounced. When a core cane with a low core-clad ratio is used, in contrast, the updoped region is removed from the interface between the core cane and soot cladding monolith and is surrounded by an undoped material that more closely matches the thermal expansion coefficient of the cladding. As a result, thermal stresses arising from contraction are less pronounced and fewer defects form upon cooling.

Figure 9:
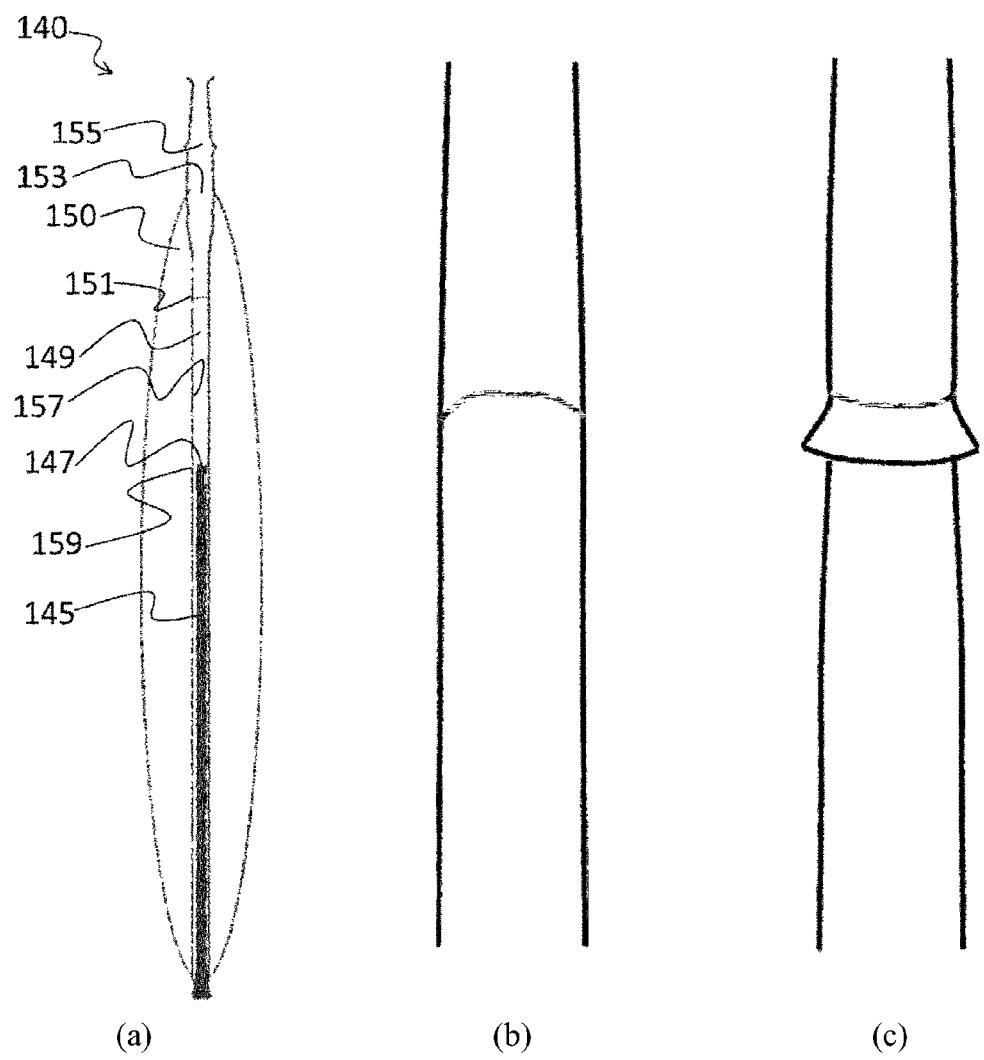
FIGS. 9(a)-(c) show a fiber preform prepared by a cane-in-soot process.

FIGS. 9(a)-(c) show an optical fiber preform formed from the cane-in-soot process using a core cane with flat end surfaces. FIG. 9(a) is a schematic showing optical fiber preform 140. Optical fiber preform 140 includes core cane 145 and consolidated cladding 150 supported by metal handle 155, which extends to terminal point 151. Handle 155 passes through entrance 153 to internal cavity 157 of consolidated cladding 150. Core cane 145 is situated in internal cavity 157 and has a generally cylindrical shape that includes flat end surface 147 that faces entrance 153 of internal cavity 157. Headspace 149 between end surface 147 and terminal point 151 of handle 155 is occupied by air and/or gases present in the processing environment. Junction 159 constitutes a three-way interface between consolidated cladding 150, core cane 145, and the gases present in headspace 149.

FIGS. 9(b) and 9(c) show images of an optical fiber preform consistent with the schematic shown in FIG. 9(a). The preform was prepared by the cane-in-soot process. The image shown in FIG. 9(b) is an image of the preform at elevated temperature (1050° C.) after consolidation and before cooling. The image shown in FIG. 9(b) indicates that no appreciable concentration of defects was present in the preform before cooling. The image shown in FIG. 9(c) is an image of the preform after cooling to room temperature. The image shown in FIG. 9(c) shows the presence of defects (e.g. check defects or "checks") in the cooled preform. When optical fiber preforms having check defects are reheated to the draw temperature for drawing fibers, the optical fiber preform may fracture due to shearing, crack propagation or other forces arising from the defects. Fracture leads to failure of the optical fiber preform and necessitates termination of the drawing process.

Figure 10:
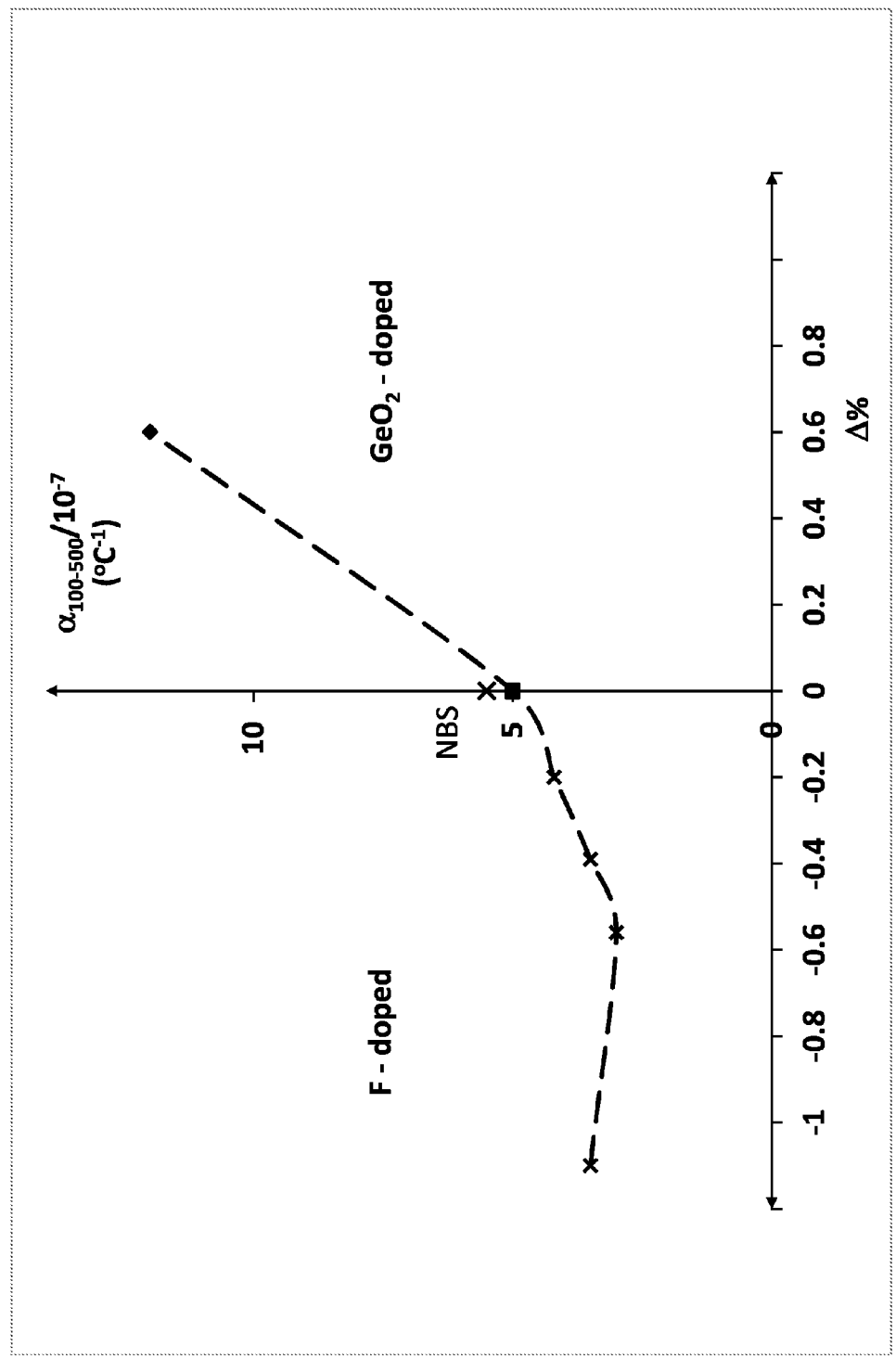
FIG. 10 shows the thermal expansion coefficient of Ge-doped silica, undoped silica, and F-doped silica glasses.

The origin of the defects that develop during cooling of cane-in-soot preforms is believed to be due to a mismatch in the coefficient of thermal expansion of the core and cladding regions of the preform. As noted hereinabove, the core is typically an updoped silica material and the cladding is typically undoped silica or a combination of undoped silica and downdoped silica. Ge is a common updopant for the core region and the coefficient of thermal expansion of Ge-doped $SiO_2$ is known to be significantly higher than the coefficient of thermal expansion of undoped silica or downdoped silica. FIG. 10 shows the average coefficient of thermal expansion $\alpha_{100-500}$ over the temperature interval from 100° C. to 500° C. as a function of relative refractive index $\Delta\%$ for Ge-doped silica, undoped silica, and F-doped silica. The relative refractive index $\Delta\%$ is a measure of refractive index relative to undoped silica and is proportional to doping concentration. Positive values of $\Delta\%$ signify updoped forms of silica, negative values of $\Delta\%$ signify downdoped forms of silica, and $\Delta\%=0$ corresponds to undoped silica. For purposes of FIG. 10, Ge is included as an updopant and F is included as a down dopant. FIG. 10 shows that the coefficient of thermal expansion of Ge-doped silica increases with increasing Ge doping concentration and is higher than the coefficient of thermal expansion of both undoped silica and F-doped silica.

For Ge-doped silica, the coefficient of thermal expansion (CTE) (in units of 1/° C.) and $\Delta\%$ are related to $GeO_2$ concentration [$GeO_2$] (in units of weight percent) through $$CTE=(5.05+0.42075[GeO_2])\times 10^{-7} \qquad \text{Eq. 2}$$

and $$\Delta\%=0.055[GeO_2] \qquad \text{Eq. 3}$$

Figure 11:
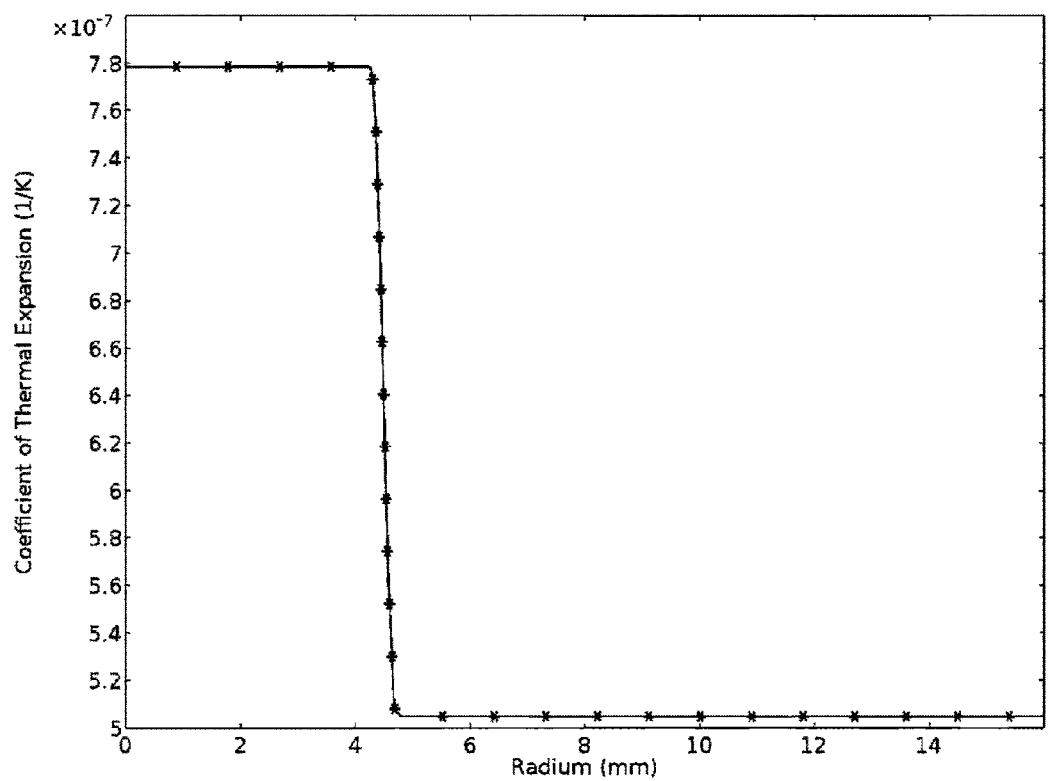
FIG. 11 shows the coefficient of thermal expansion of a preform having a Ge-doped silica core and an undoped silica cladding.

FIG. 11 shows the radial dependence of the coefficient of thermal expansion at room temperature calculated from Eq. 2 of an optical fiber preform having a Ge-doped silica core and an undoped silica cladding. The Ge-doped silica core has a radius of 5 mm and a core-clad ratio of 0.9. The Ge dopant distribution conformed to a step index-profile having a peak dopant concentration of 6.5 wt % at the centerline position of the core (r=0) and remaining substantially flat out to r=4.5 mm. The cladding was undoped silica with an inner radius of 5 mm and an outer radius of 65 mm. The cladding was in direct contact with the core. FIG. 11 indicates that the coefficient of thermal expansion is significantly higher in the core region than in the cladding region of the preform. The peak coefficient of thermal expansion in the core region is $8.42 \times 10^7/°$ C., while the coefficient of thermal expansion of undoped silica is $5.05 \times 10^7/°$ C. Although the concentration of Ge decreases with radius in the core region, the coefficient of thermal expansion in the outer radial portions of the core remains appreciably higher than the coefficient of thermal expansion of undoped silica.

Figure 12:
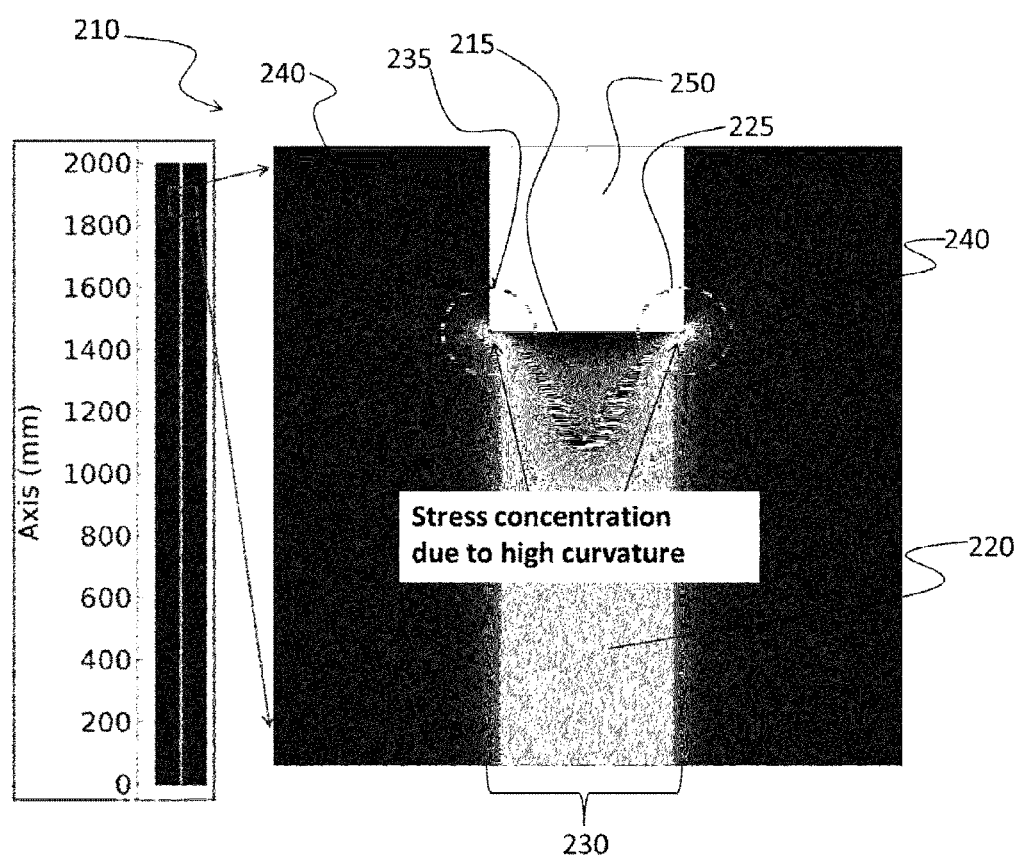
FIG. 12 depicts the radial tensile stress distribution in the vicinity of the end surface of a core cane in a consolidated fiber preform made by the cane-in-soot process.

Differences in thermal expansion coefficient between the core and cladding lead to the development of stresses due to differential contraction upon cooling the preform. FIG. 12 shows the calculated radial tensile stress distribution in end portion 210 of an optical fiber preform made by the cane-in-soot process after cooling to room temperature. In the calculation, the Young's modulus was 73.1 GPa and Poisson's ratio was 0.17. The stress-free temperature was chosen to be 1100° C. (the annealing point of undoped silica). The preform had a total length of 2000 mm as shown at left in FIG. 12 and end portion 210 corresponds to the enlarged portion indicated in FIG. 12 in the vicinity of end surface 215 of the core cane. End portion 210 includes core cane 220 and cladding 240. Core cane 220 is cylindrical in shape and has a diameter 230 of 10 mm with a centerline positioned at r=0. Core cane 220 is Ge-doped silica having the doping profile with the radial distribution of coefficient of thermal expansion and core-clad ratio shown in FIG. 11. Cladding 240 is made from undoped silica and extends radially outward from an inner radius of 5 mm to an outer radius of 65 mm. Only the portion of cladding 240 proximate to core cane 220 is depicted in FIG. 12. Cladding 240 has an annular shape and surrounds core cane 220. End portion 210 also includes headspace 250 that permits expansion of core cane 220 in the axial direction during formation of the preform. The presence of headspace 250 insures that the expansion of core cane 220 that may occur during consolidation of the core-cladding assembly does not cause core cane 220 to contact the handle. Contact of core cane 220 with the handle creates shear stresses that lead to cracking of the preform.

The radial tensile stress that develops during cooling of the preform during consolidation is depicted in FIG. 12. Dark regions are regions of low radial tensile stress and light regions are regions of high radial tensile stress. Regions of high radial tensile stress are present in the central doped portion of core cane 220 and in encircled corner regions 225 and 235. The undoped outer radial portion of core cane 220 exhibits low radial tensile stresses. Corner regions 225 and 235 are at the junction of the interface of core cane 220, cladding 240, and overhead gas in headspace 250. The overhead gas may be air, a process gas, an inert gas, or other gas. The high radial tensile stresses present at corner regions 225 and 235 are believed to be due to the mismatch in thermal expansion coefficient of the core and cladding and are believed to develop upon cooling of the preform following consolidation. The high radial tensile stresses present at corner regions 225 and 235 are also believed to lead to shearing and fracturing of the preform upon reheating of the preform to draw temperature.

Figure 13:
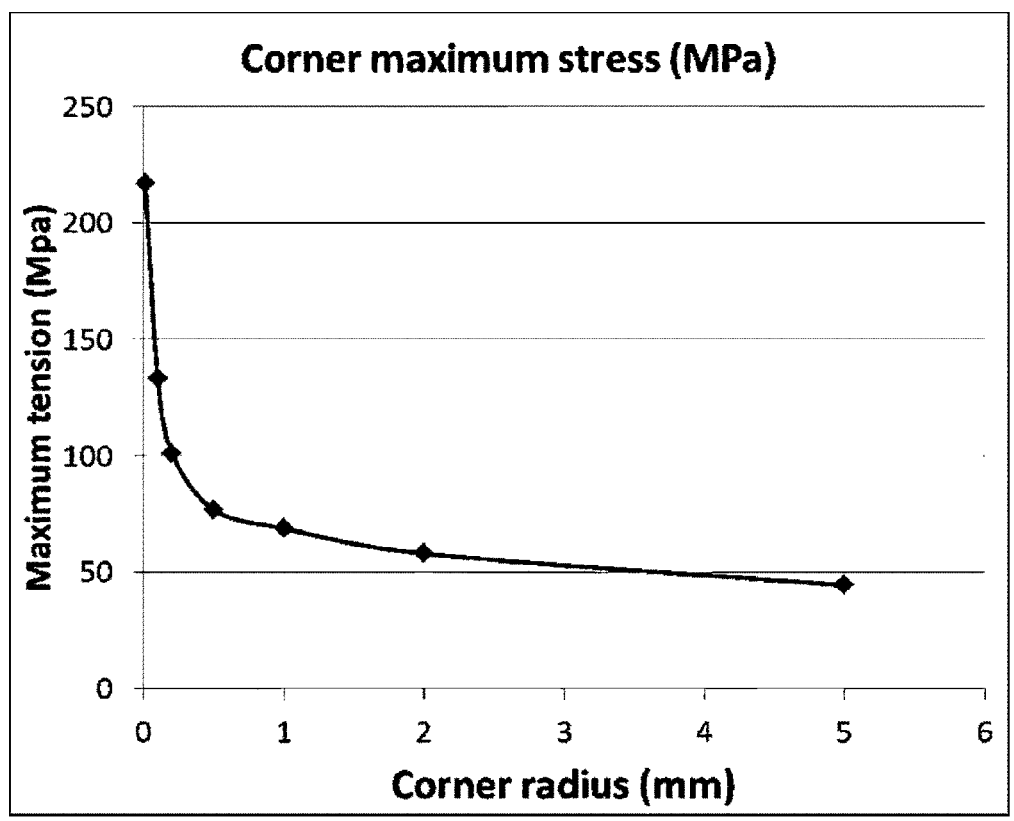
FIG. 13 shows the dependence of radial tensile stress on corner radius.

FIG. 13 shows the calculated radial tensile stress at the corner regions of the preform as a function of corner radius for the preform shown in FIG. 12. Corner radius is a measure of the shape of the surface of end portion 210 in the transition region from core cane 220 to cladding 240. Large corner radius corresponds to a smooth, gradual transition across the interface from core cane 220 to cladding 240, while a small corner radius signifies an abrupt, more discontinuous transition across the interface from core cane 220 to cladding 240. FIG. 13 shows that radial tensile stress decreases with increasing corner radius. Under cooling rates from the consolidation temperature that are typically used in the manufacture of the preform in the cane-in-soot process, the corner radius of the preform is well below 0.1 mm and often below 0.01 mm. The radial tensile stress at the corner region is accordingly high and likely sufficient in magnitude to induce the formation of cracks or other defects in the preform. A theoretical model predicts a failure rate of over 80% at the radial tensile stresses present for a corner radius of 0.1 mm.

Figure 14:
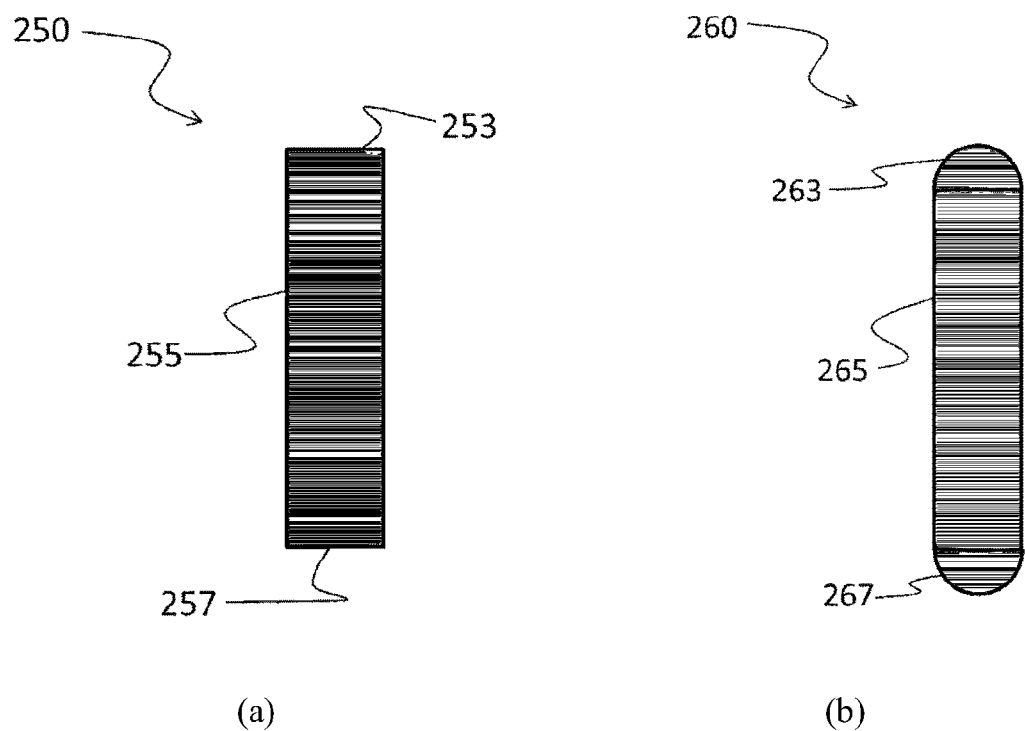
FIG. 14 shows a consolidated core cane with (a) flat end surfaces and (b) convex end surfaces.

The present disclosure provides a strategy for minimizing radial tensile stresses in the corner region(s) of consolidated preforms made in the cane-in-soot process. The strategy includes modifying the shape of the end surface of the core cane used in the fabrication of the preform. In the conventional cane-in-soot process, the core cane is generally cylindrical in shape with end surfaces that are flat or convex. FIG. 14 shows vertical cross-sections of conventional consolidated core cane geometries used in the cane-in-soot process. Core cane 250 and core cane 260 have round horizontal cross-sections and are generally cylindrical in shape. Core cane 250 includes lateral surface 255 and flat end surfaces 253 and 257. Core cane 260 includes lateral surface 265 and convex end surfaces 263 and 267.

The present disclosure provides core canes with contoured end surfaces having a depression. The depression is an indentation or depressed region formed by shaping one or more end surfaces of the core cane to form one or more feature that recede into the interior of the core cane. The depression(s) may be formed by removing material from the end surface of the core cane. The depression(s) may have arbitrary or controlled shape(s) with smooth or irregular surfaces. The cross-section of the depression may be round, circular, elliptical, square, rectangular, polygonal, or other closed contour having round and/or linear sides or edges. Representative shapes for the depression include ellipsoidal, conical, hemispherical, annular, cylindrical, rectangular or square channel, round channel, or groove.

The dimensions of a depression may be expressed in terms of a lateral dimension and a depth dimension. A dimension of a depression parallel to or along the direction of the end surface may be referred to herein as a lateral dimension of the depression. A dimension of a depression normal to the lateral dimension of the depression may be referred to as a depth dimension of the depression. A depression may have more than one lateral dimension and/or more than one depth dimension. A depression with a rectangular cross-section, for example, has two lateral dimensions (e.g. length and width), while a depression with a square or circular cross-section has one lateral dimension (e.g. side length or diameter). Unless otherwise specified herein, the term lateral dimension when used without qualification refers to the largest of the one or more lateral dimensions of a depression. Similarly, unless otherwise specified herein, the term depth dimension refers to the largest of the one or more depth dimensions of a depression.

Figure 15:
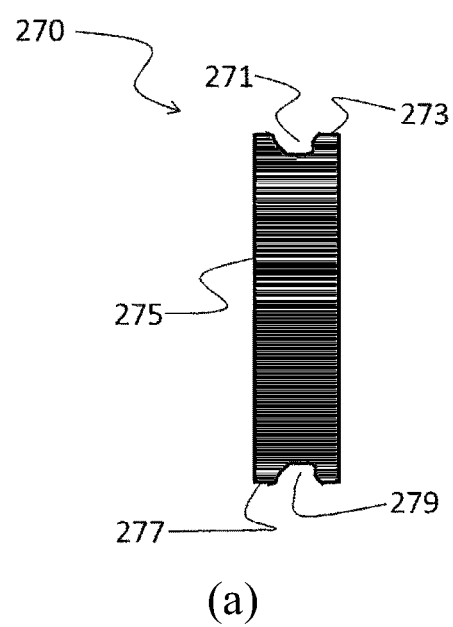
FIG. 15 shows (a) a core cane having end surfaces with depressions, (b) formation of a core-cladding assembly using a core cane with end surfaces having depressions, and (c) formation of a preform from the core-cladding assembly depicted in (b).
Figure 15:
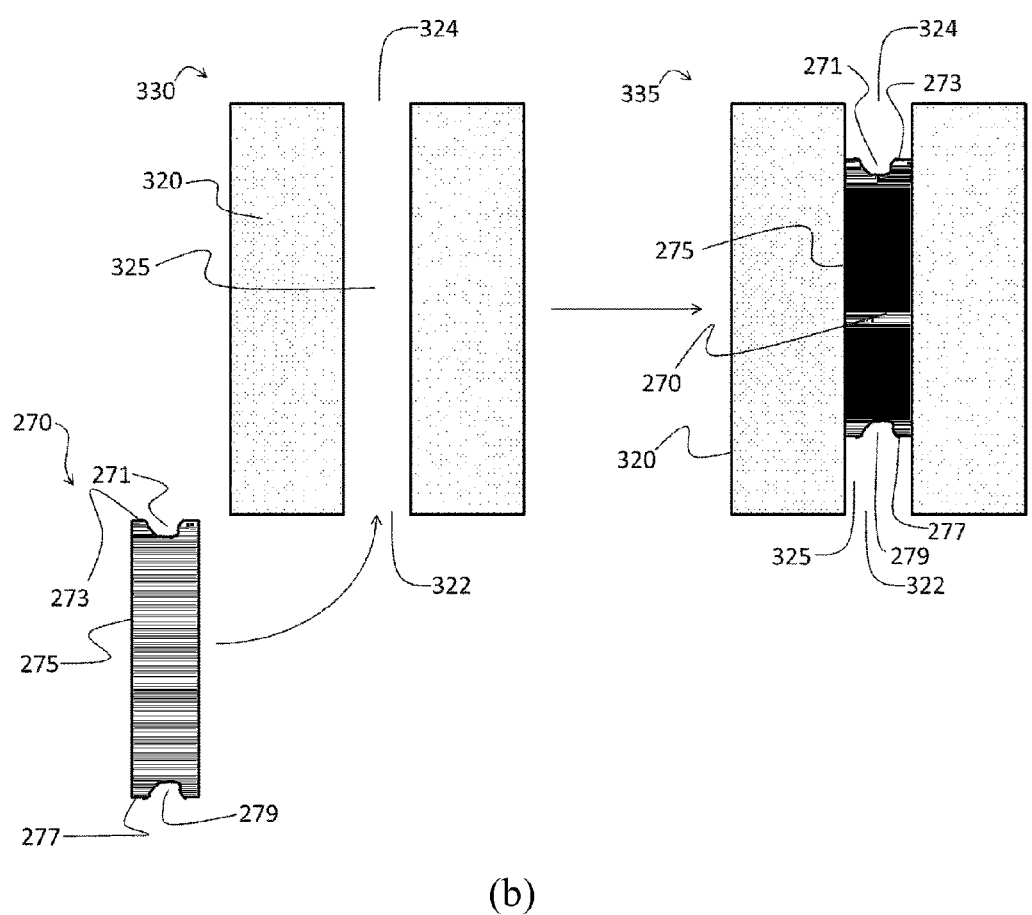
Figure 15:
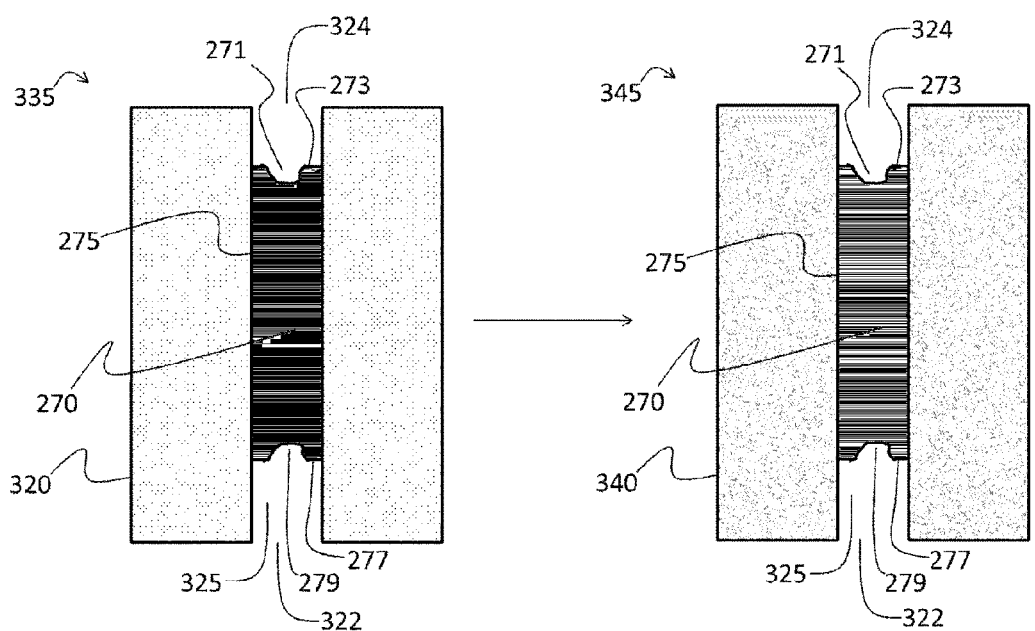

FIG. 15(a) shows an embodiment of a core cane with end surfaces having depressions. Core cane 270 includes lateral surface 275, end surface 273 and end surface 277. End surface 273 includes depression 271 and end surface 277 includes depression 279. Any one or all end surfaces may include depressions and the shape of the depression may differ for different end surfaces.

FIG. 15(b) shows formation of a core-cladding assembly in a cane-in-soot process using core cane 270 shown in FIG. 15(a). Core cane 270 is inserted through entrance 322 into internal cavity 325 of soot cladding monolith 330 to form core-cladding assembly 335. Soot cladding monolith 330 and core-cladding assembly 335 are shown in cross-section. Soot cladding monolith 330 includes internal cavity 325 within annular porous soot region 320. Internal cavity 325 includes entrances 322 and 324 into which a core cane can be inserted. In core-cladding assembly 335, end surface 273 and depression 271 face entrance 324 and end surface 277 and depression 279 face entrance 322.

FIG. 15(c) shows consolidation of core-cladding assembly 335 to form preform 345. Preform 345 includes core cane 270 within internal cavity 325. Internal cavity 325 is circumscribed by annular consolidated soot region 340. Consolidated soot region 340 is a fully densified glass.

Close proximity of a depression to the junction between the core cane, soot cladding monolith and overhead gas leads to a reduction in radial stress and decreases the likelihood of preform failure during fiber draw. To assess the reduction in radial stress at the junction, calculations based on the model described hereinabove in connection with FIG. 12 was employed using core canes with depressions having ellipsoidal and conical shapes. The calculations assumed core canes with a Ge-doped silica core, undoped silica cladding, a Young's modulus of 73.1 GPa and Poisson's ratio of 0.17. The stress-free temperature was chosen to be 1100° C. (the annealing point of undoped silica). The Ge-doped silica core had a radius of 5 mm and a core-clad ratio of 0.9. The Ge dopant distribution conformed to a step index profile having a peak dopant concentration of 6.5 wt % at the centerline position of the core (r=0). The radial variation in the coefficient of thermal expansion coefficient was as shown in FIG. 11. The cladding was undoped silica with an inner radius of 5 mm and an outer radius of 65 mm. The cladding was in direct contact with the core.

FIG. 16(a) shows a core cane with an end surface having a depression with an ellipsoidal shape. The core cane has diameter d. The ellipsoidal depression has radius a in the direction of the end surface and radius b in the direction normal to the end surface. Radius a is a measure of the size of the ellipsoidal depression in the lateral direction of the end surface and radius b is a measure of the depth of the ellipsoidal depression into the core cane. FIG. 16(b) shows a core cane with an end surface having a depression with a conical shape. The core cane has diameter d. The conical depression has radius a and height h. The radius a is a measure of the size of the conical depression in the lateral direction of the end surface and height h is a measure of the depth of the conical depression into the core cane. FIG. 16(c) shows a cutting cool that can be used to form a conical depression. Related tools can be used to form depressions having ellipsoidal and arbitrary shapes.

FIG. 17 shows the radial tensile stress of preforms made by the cane-in-soot process after cool down. The preforms were made from core canes having ellipsoidal depressions on an end surface. FIG. 17(a) is a control preform made from a core cane having a flat end surface. FIG. 17(b) is a preform made from a core cane having an ellipsoidal depression with radius a=5 mm and radius b=1 mm. FIG. 17(c) is a preform made from a core cane having an ellipsoidal depression with radius a=5 mm and radius b=3 mm. FIG. 17(d) is a preform made from a core cane having an ellipsoidal depression with radius a=5 mm and radius b=5 mm.

Figure 18:
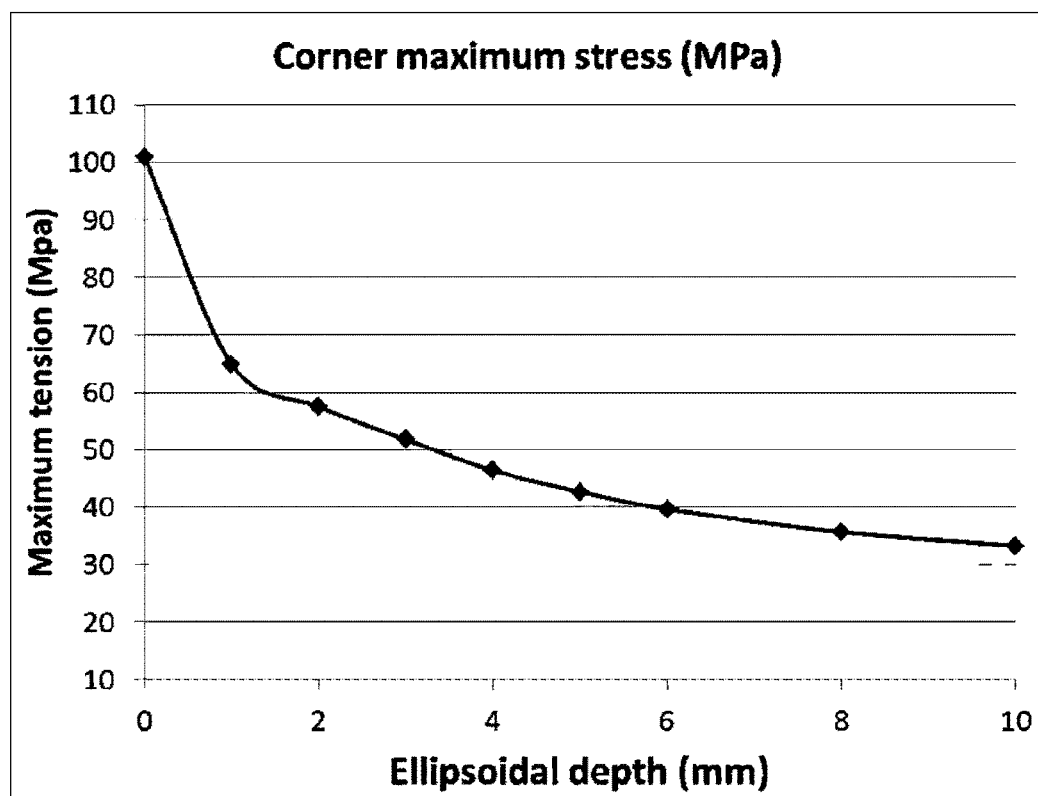
FIG. 18 illustrates the radial stress at the triple junction (interface of core-cane, cladding, and overhead gas) of an optical preform made by a cane-in-soot process using a core cane having an end surface with an ellipsoidal depression as a function of the depth of the ellipsoidal depression.

In FIGS. 17(a)-(d), dark regions are regions of low radial tensile stress and light regions are regions of high radial tensile stress. Of particular interest is the variation in radial tensile stress at the junction between the core cane, cladding, and overhead space with the dimensions of the ellipsoidal depression. The junction regions correspond to the encircled corner regions. The highest radial corner stress is observed in FIG. 17(a), which corresponds to a consolidated preform made from a core cane with flat end surfaces. The radial corner stress is observed to decrease when the end surface of the core cane includes an ellipsoidal depression. The ellipsoidal depressions depicted in FIGS. 17(b)-(d) have a common radius a and variable radius b. As noted hereinabove, radius b is a measure of the depth of the depression. FIGS. 17(b)-(d) indicate that as the depth of the ellipsoidal depression increases, the radial corner tensile stress decreases. The trend is quantified in FIG. 18, which shows the variation in radial corner stress with depth b of an ellipsoidal depression having a radius a=5 mm. The data point at b=0 corresponds to a core cane having a flat end surface (FIG. 17(a)). A continuous decrease in radial corner tensile stress is observed as the depth of the ellipsoidal depression increases.

Figure 19:
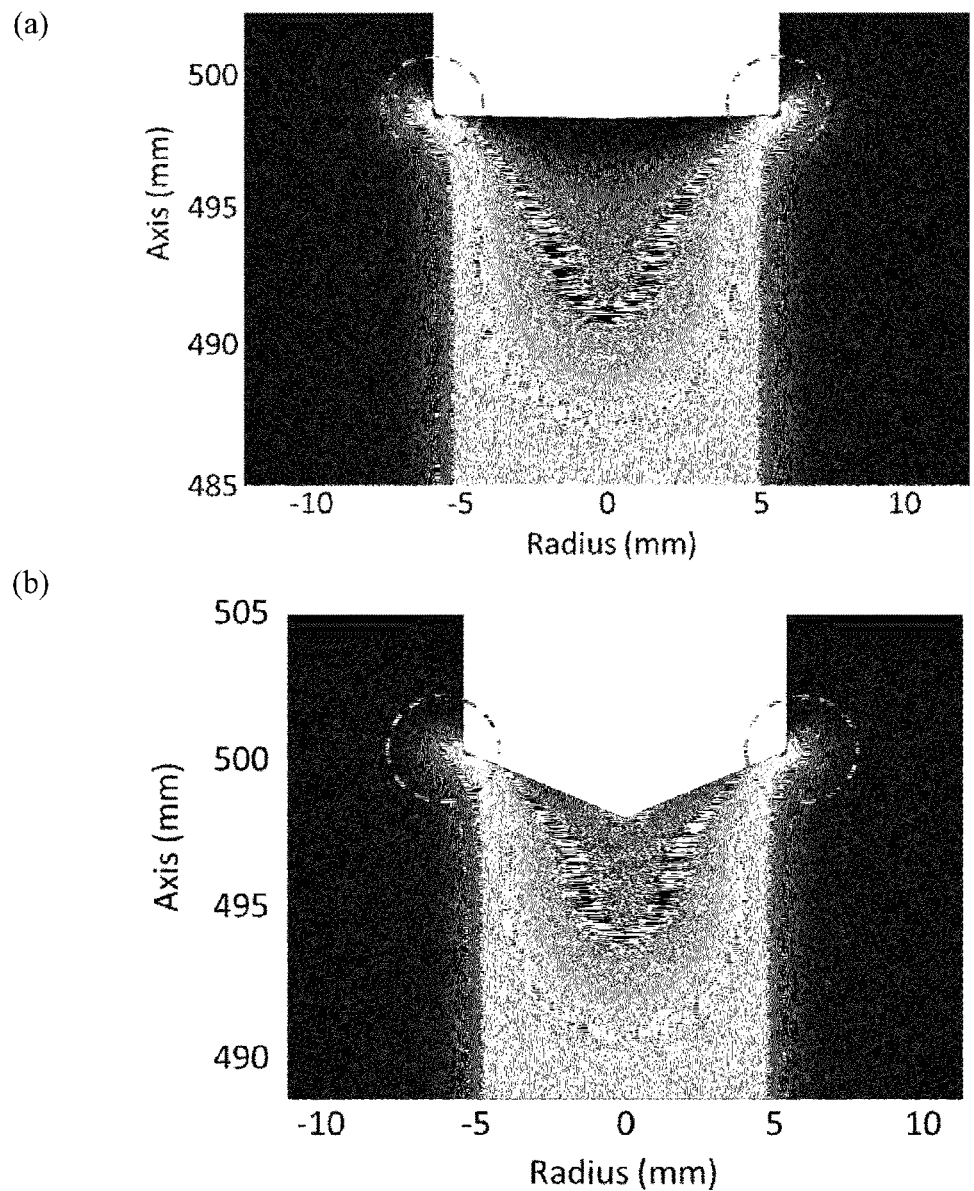
FIG. 19 depicts the radial tensile stress distribution in the vicinity of the end surface of a core cane in a consolidated fiber preform made by the cane-in-soot process for (a) a core cane with a flat end surface and (b)-(d) a core cane with conical depressions of various sizes.
Figure 19:
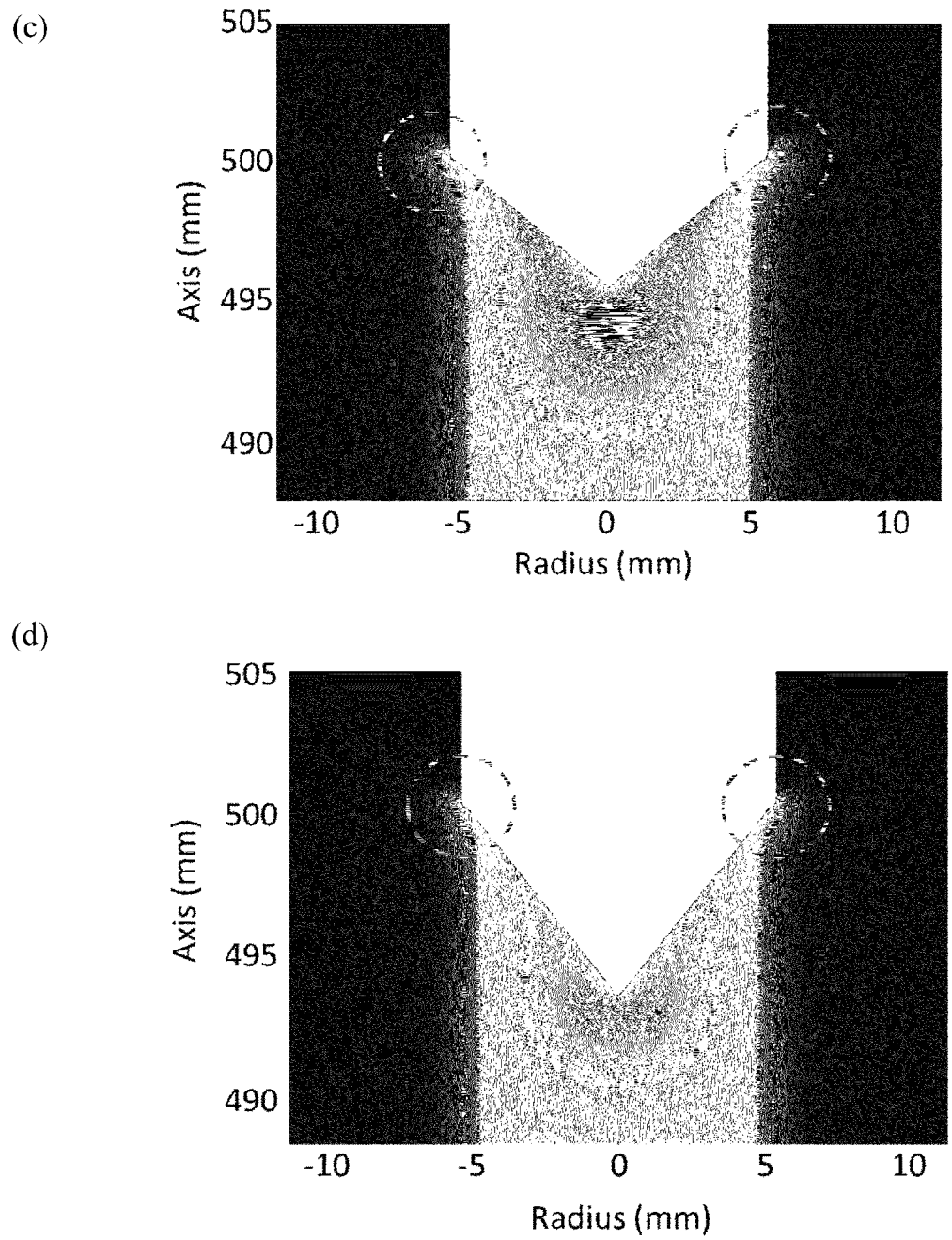

FIG. 19 shows the radial tensile stress of preforms made by the cane-in-soot process after cool down. The preforms were made from core canes having conical depressions on an end surface. FIG. 19(a) is a control preform made from a core cane having a flat end surface. FIG. 19(b) is a preform made from a core cane having an ellipsoidal depression with radius a=5.5 mm and height h=2 mm. FIG. 19(c) is a preform made from a core cane having an ellipsoidal depression with radius a=5.5 mm and height h=5 mm. FIG. 19(d) is a preform made from a core cane having an ellipsoidal depression with radius a=5.5 mm and height h=8 mm.

Figure 20:
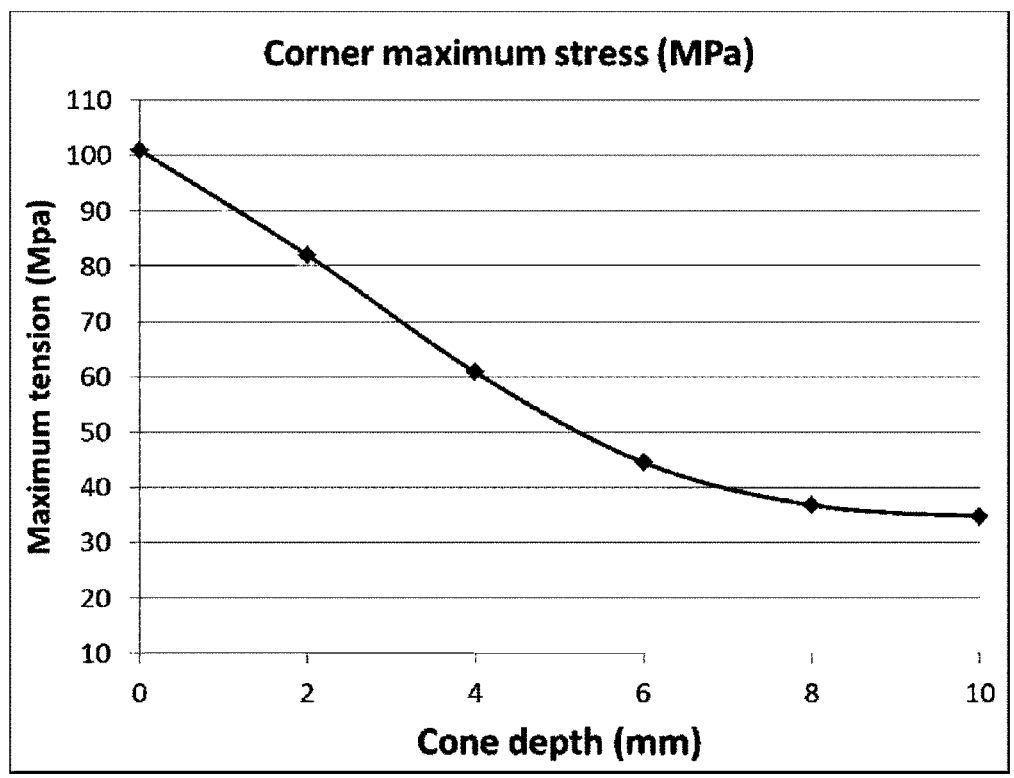
FIG. 20 illustrates the radial stress at the triple junction (interface of core-cane, cladding, and overhead gas) of an optical preform made by a cane-in-soot process using a core cane having an end surface with a conical depression as a function of the depth of the conical depression.

In FIGS. 19(a)-(d), dark regions are regions of low radial tensile stress and light regions are regions of high radial tensile stress. Of particular interest is the variation in radial tensile stress at the junction between the core cane, cladding, and overhead space with the dimensions of the conical depression. The junction regions correspond to the encircled corner regions. The highest radial corner stress is observed in FIG. 19(a), which corresponds to a consolidated preform made from a core cane with flat end surfaces. The radial corner stress is observed to decrease when the end surface of the core cane includes a conical depression. The conical depressions depicted in FIGS. 19(b)-(d) have a common radius a and variable height h. As noted hereinabove, height h is a measure of the depth of the depression. FIGS. 19(b)-(d) indicate that as the depth of the conical depression increases, the radial corner tensile stress decreases. The trend is quantified in FIG. 20, which shows the variation in radial corner stress with height (depth) h of an ellipsoidal depression having a radius a=5.5 mm. The data point at h=0 corresponds to a core cane having a flat end surface (FIG. 19(a)). A continuous decrease in radial corner tensile stress is observed as the depth of the ellipsoidal depression increases.

The radial tensile stress at the corner region of the preform may be less than 100 MPa, or less than 80 MPa, or less than 60 MPa, or less than 40 MPa, or less than 20 MPa, or less than 10 MPa, or between 5 MPa and 100 MPa, or between 5 MPa and 80 MPa, or between 5 MPa and 60 MPa, or between 5 MPa and 30 MPa, or between 5 MPa and 20 MPa, or between 10 MPa and 60 MPa, or between 10 MPa and 50 MPa, or between 10 MPa and 40 MPa, or between 10 MPa and 30 MPa, or between 10 MPa and 20 MPa.

The dimensions of the depression may be expressed in terms relative to the dimensions of the core cane. Analogous to the dimensions of depressions described hereinabove, the dimensions of the core cane may be expressed in terms or one or more lateral dimensions and one or more depth dimensions. A lateral dimension of the core cane is a dimension in the plane of the surface in which a depression is formed. The surface of the core cane in which a depression is formed is referred to herein as an end surface. A depth dimension of the core cane is a dimension normal to a lateral dimension and may also be referred to herein as an axial dimension. In the case of a core cane having a cylindrical geometry, for example, the core cane has circular end surfaces with one lateral dimension (diameter) and one axial dimension (length).

A lateral dimension of a depression may be at least 60% of a lateral dimension of the end surface of the core cane, or at least 70% of a lateral dimension of the end surface of the core cane, or at least 80% of a lateral dimension of the end surface of the core cane, or at least 90% of a lateral dimension of the end surface of the core cane, or in the range from 50% to 95% of a lateral dimension of the end surface of the core cane, or in the range from 60% to 90% of a lateral dimension of the end surface of the core cane, or in the range from 70% to 90% of a lateral dimension of the end surface of the core cane.

The largest lateral dimension of a depression may be at least 60% of the largest lateral dimension of the end surface of the core cane, or at least 70% of the largest lateral dimension of the end surface of the core cane, or at least 80% of the largest lateral dimension of the end surface of the core cane, or at least 90% of the largest lateral dimension of the end surface of the core cane, or in the range from 50% to 95% of the largest lateral dimension of the end surface of the core cane, or in the range from 60% to 90% of the largest lateral dimension of the end surface of the core cane, or in the range from 70% to 90% of the largest lateral dimension of the end surface of the core cane.

A depth dimension of a depression may be at least 5% of a lateral dimension of the end surface of the core cane, or at least 10% of a lateral dimension of the end surface of the core cane, or at least 20% of a lateral dimension of the end surface of the core cane, or at least 30% of a lateral dimension of the end surface of the core cane, or in the range from 5% to 70% of a lateral dimension of the end surface of the core cane, or in the range from 10% to 60% of a lateral dimension of the end surface of the core cane, or in the range from 20% to 50% of a lateral dimension of the end surface of the core cane.

The largest depth dimension of a depression may be at least 5% of the largest lateral dimension of the end surface of the core cane, or at least 10% of the largest lateral dimension of the end surface of the core cane, or at least 20% of the largest lateral dimension of the end surface of the core cane, or at least 30% of the largest lateral dimension of the end surface of the core cane, or in the range from 5% to 70% of the largest lateral dimension of the end surface of the core cane, or in the range from 10% to 60% of the largest lateral dimension of the end surface of the core cane, or in the range from 20% to 50% of the largest lateral dimension of the end surface of the core cane.

The axial dimension of the core cane may be at least 50 cm, or at least 100 cm, or at least 250 cm, or at least 500 cm, or at least 1000 cm, or in the range from 50 cm to 5000 cm, or in the range from 100 cm to 4000 cm, or in the range from 250 cm to 3000 cm, or in the range from 500 cm to 2500 cm.

In one embodiment, the core cane has a cylindrical shape with circular end surfaces having a depression formed in one or more of the end surfaces. The lateral dimension of the depression may be at least 60% of the diameter of the end surface of the core cane, or at least 70% of the diameter of the end surface of the core cane, or at least 80% of the diameter of the end surface of the core cane, or at least 90% of the diameter of the end surface of the core cane, or in the range from 50% to 95% of the diameter of the end surface of the core cane, or in the range from 60% to 90% of the diameter of the end surface of the core cane, or in the range from 70% to 90% of the diameter of the end surface of the core cane. The depth dimension of the depression may be at least 5% of the diameter of the end surface of the core cane, or at least 10% of the diameter of the end surface of the core cane, or at least 20% of the diameter of the end surface of the core cane, or at least 30% of the diameter of the end surface of the core cane, or in the range from 5% to 70% of the diameter of the end surface of the core cane, or in the range from 10% to 60% of the diameter of the end surface of the core cane, or in the range from 20% to 50% of the diameter of the end surface of the core cane.

The end surface of the core cane may include one depression or a plurality of depressions. In embodiments in which the end surface includes only one depression, the depression may be centered in the end surface or offset from the center of the end surface. In embodiments in which the end surface includes a plurality of depressions, the depressions may be disposed symmetrically about the center of the end surface or non-symmetrically about the center of the end surface. The core cane may include a plurality of end surfaces, where one, some or all of the end surfaces include depressions. Depressions within an end surface or on different end surfaces may have the same or different size or shape. In one embodiment, the core cane includes two end surfaces, both of which include depressions. In another embodiment, the core cane includes two end surfaces, one of which includes a depression and one of which is flat.

The reduction of radial corner tensile stresses available from the present disclosure enables production of preforms from core canes having a large core-clad ratio without significant development of defects during cooling of the preform in the consolidation process. The core-clad ratio of the core can may be greater than 0.30, or greater than 0.40, or greater than 0.50, or greater than 0.60, or greater than 0.70, or greater than 0.80, or greater than 0.85, or greater than 0.90, or greater than 0.95, or in the range from 0.30 to 1.0, or in the range from 0.60 to 0.95, or in the range from 0.65 to 0.95, or in the range from 0.70 to 0.95, or in the range from 0.75 to 0.95, or in the range from 0.80 to 0.95, or in the range from 0.60 to 0.90, or in the range from 0.65 to 0.90, or in the range from 0.70 to 0.90, or in the range from 0.75 to 0.90, or in the range from 0.80 to 0.90.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A core-cladding assembly comprising:
   a porous soot cladding monolith, said porous soot cladding monolith including a first porous cladding glass layer surrounding an internal cavity, said porous soot cladding monolith having a first coefficient of thermal expansion, said internal cavity including a first entrance;

a consolidated glass body positioned in said internal cavity, said consolidated glass body having a second coefficient of thermal expansion and a first end surface within said internal cavity, said first end surface facing said first entrance and including a first depression.

2. The core-cladding assembly of claim 1, wherein said consolidated glass body comprises doped silica.

3. The core-cladding assembly of claim 1, wherein said first porous cladding glass layer is in direct contact with said consolidated glass body.

4. The core-cladding assembly of claim 2, wherein said consolidated glass body has a core-clad ratio of at least 0.70.

5. The core-cladding assembly of claim 1, wherein said second coefficient of thermal expansion is greater than said first coefficient of thermal expansion.

6. The core-cladding assembly of claim 1, wherein said first depression has an ellipsoidal, conical, hemispherical, annular, cylindrical, rectangular channel, square channel, or round channel shape.

7. The core-cladding assembly of claim 1, wherein said first depression has a lateral dimension that is in the range from 50% to 95% of a lateral dimension of said first end surface.

8. The core-cladding assembly of claim 1, wherein said first depression has a depth dimension that is in the range from 5% to 70% of a lateral dimension of said first end surface.

9. The core-cladding assembly of claim 1, wherein said consolidated glass body has a cylindrical shape and said first end surface has a circular cross-section.

10. The core-cladding assembly of claim 1, wherein said consolidated glass body includes a second end surface, said second end surface including a second depression.

11. A product formed by consolidating the core-cladding assembly of claim 1.

12. A method of producing an optical fiber comprising:
providing a porous soot cladding monolith, said soot cladding monolith including a first porous glass cladding layer and having an internal cavity, said internal cavity including a first entrance; and inserting a core cane into said internal cavity to form a core-cladding assembly, said core cane including a first end surface, said first end surface including a first depression and facing said first entrance.

13. The method of claim 12, wherein said core cane comprises doped silica.

14. The method of claim 12, wherein said first porous cladding glass layer is in direct contact with said core cane.

15. The method of claim 13, wherein said core cane has a core-clad ratio of at least 0.70.

16. The method of claim 12, wherein said soot cladding monolith has a first coefficient of thermal expansion and said core cane has a second coefficient of thermal expansion, said second coefficient of thermal expansion being greater than said first coefficient of thermal expansion.

17. The method of claim 12, wherein said first depression has a lateral dimension that is in the range from 50% to 95% of a lateral dimension of said first end surface.

18. The method of claim 12, wherein said first depression has a depth dimension that is in the range from 5% to 70% of a lateral dimension of said first end surface.

19. The method of claim 12, further comprising consolidating said core-cladding assembly and drawing a fiber from said consolidated core-cladding assembly.

* * * * *

UNITED STATES PATENT AND TRADEMARK OFFICE
CERTIFICATE OF CORRECTION

PATENT NO. : 9,919,956 B2  
APPLICATION NO. : 15/273033  
DATED : March 20, 2018  
INVENTOR(S) : Xiaoming Luo et al.

Page 1 of 1

It is certified that error appears in the above-identified patent and that said Letters Patent is hereby corrected as shown below:

On the Title Page

In Column 2, item (57), Abstract, Line 4, delete "core cladding" and insert -- core-cladding --, therefor.

In Column 2, item (57), Abstract, Line 10, delete "core can" and insert -- core cane --, therefor.

Signed and Sealed this  
Ninth Day of June, 2020

Andrei Iancu  
*Director of the United States Patent and Trademark Office*